(12) United States Patent
Kobayashi

(10) Patent No.: US 8,315,954 B2
(45) Date of Patent: Nov. 20, 2012

(54) DEVICE, METHOD, AND PROGRAM FOR HIGH LEVEL FEATURE EXTRACTION

(75) Inventor: Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 667 days.

(21) Appl. No.: 11/722,508

(22) PCT Filed: Oct. 25, 2006

(86) PCT No.: PCT/JP2006/021260
§ 371 (c)(1), (2), (4) Date: Oct. 22, 2009

(87) PCT Pub. No.: WO2007/049641
PCT Pub. Date: May 3, 2007

(65) Prior Publication Data
US 2010/0094782 A1 Apr. 15, 2010

(30) Foreign Application Priority Data

Oct. 25, 2005 (JP) .................. 2005-310410
Oct. 16, 2006 (JP) .................. 2006-281267

(51) Int. Cl.
*G06F 15/18* (2006.01)
(52) U.S. Cl. ........................................ 706/12
(58) Field of Classification Search .................. None
See application file for complete search history.

(56) References Cited

U.S. PATENT DOCUMENTS

| 6,951,977 B1 | 10/2005 | Streitenberger et al. |
| 7,035,742 B2 | 4/2006 | Klefenz et al. |
| 2004/0068401 A1 | 4/2004 | Herre et al. |
| 2004/0094019 A1 | 5/2004 | Herre et al. |

(Continued)

FOREIGN PATENT DOCUMENTS

JP  2000-20504 A  1/2000

(Continued)

OTHER PUBLICATIONS

D. Charlet et al., "Optimizing feature set for speaker verification", Pattern Recognition Letters, vol. 18, pp. 873-879 (1997).

(Continued)

*Primary Examiner* — Alan Chen
*Assistant Examiner* — Paulinho E Smith
(74) *Attorney, Agent, or Firm* — Finnegan, Henderson, Farabow, Garrett & Dunner, L.L.P.

(57) ABSTRACT

The present invention relates to an information processing apparatus, an information processing method, and a program capable of quickly and accurately creating an algorithm for extracting features from content data such as song data. A feature extraction algorithm creation apparatus 20 includes: a low-level feature extraction expression list creation section 21 that creates as many as "n" low-level feature extraction expression lists each constituted by "m" low-level feature extraction expressions; a low-level feature computation section 24 that substitutes input data of "j" songs into "n" low-level feature extraction expression lists so as to acquire "n" combinations of "m" low-level features corresponding to each input data item; and a high-level feature extraction expression learning section 25 that estimates high-level feature extraction expressions through learning based on training data corresponding to "n" low-level feature outputs ("k" high-level features corresponding to each of "j" songs). This invention can be applied to systems for acquiring high-level features of songs and videos.

9 Claims, 41 Drawing Sheets

U.S. PATENT DOCUMENTS

| | | | |
|---|---|---|---|
| 2004/0181401 A1* | 9/2004 | Pachet et al. | 704/223 |
| 2004/0255758 A1 | 12/2004 | Klefenz et al. | |
| 2005/0211077 A1 | 9/2005 | Kobayashi | |
| 2005/0217463 A1 | 10/2005 | Kobayashi | |
| 2006/0064299 A1 | 3/2006 | Uhle et al. | |
| 2006/0075884 A1 | 4/2006 | Streitenberger et al. | |

FOREIGN PATENT DOCUMENTS

| | | |
|---|---|---|
| JP | 2004-355174 | 12/2004 |
| JP | 2005253706 | 9/2005 |
| JP | 2006-274708 | 10/2005 |
| JP | 2006-275088 | 10/2005 |
| WO | WO 2005/008365 A2 | 1/2005 |
| WO | WO 2005/122136 | 12/2005 |
| WO | WO 2006/034743 | 4/2006 |

OTHER PUBLICATIONS

A. N. Mucciardi, et al., "A Comparison of Seven Techniques for Choosing Subsets of Pattern Recognition Properties", IEEE Transactions on Computers, vol. c-20, No. 9, pp. 1023-1031, XP009119162 (1971).

Supplementary European Search Report dated Mar. 10, 2010, in EP 06 82 2237.

Zils, A. et al., "Automatic extraction of music descriptors for acoustic signals using EDS.", In Audio Engineering Society Convention Paper, 12 pages, (2004).

Masayuki Moriyama et al., "Identeki Algorithm o Mochiita Kakyoku no Sakkyoku Shien Hoho no Ichi Teian", Dai 4 Kai Forum on Information Technology Ronbunshu, Aug. 22, 2005, pp. 279-280.

Masahiro Takeuch; et al., "Identeki Programming o Mochiita CM Song Hyoka ni Tsuite", ITE Technical Report (Media Kogaku), Oct. 22, 2004, ME 2004-168, vol. 28, No. 82, pp. 13-16.

Lu Jianjun et al., "Identeki Programming ni yoru Jikeiretsu Mosel no Shugoteki Kinji to Clustering ono Oyo", The Transactions of the Institute of Electronics, Information and Communicat Engineers A, Jul. 1, 2006, vol. J88-A, No. 7, pp. 803-813.

Chin-Tang Lin et al., GA-Based Noisy Speech Recognition Using Two-Dimensional Cepstrum IEEE Trans. on Speech and Audits Processing. vol. 8, No. 6, pp. 664-675, 2000.

S. A. Selouani et al., "Robustness of Speech Recognition Using Genetic Algorithms and Mel-cepstral Subspace Approach", Proc. of ICASSP, 2004, vol. 1, pp. 201-204, 2004.

* cited by examiner

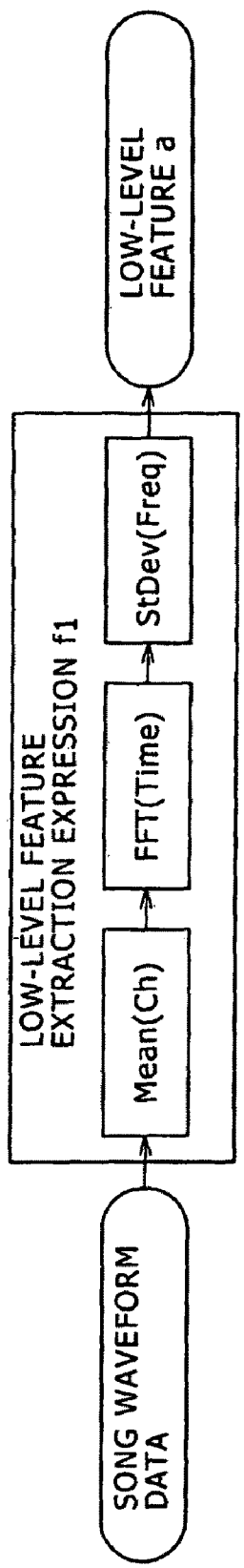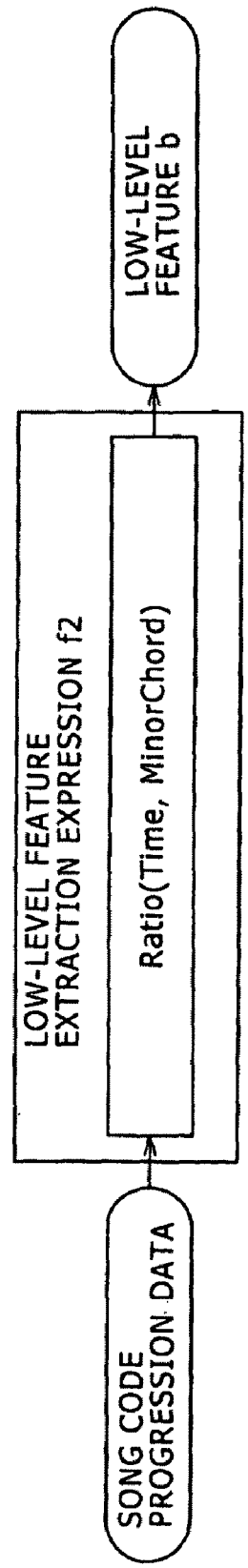

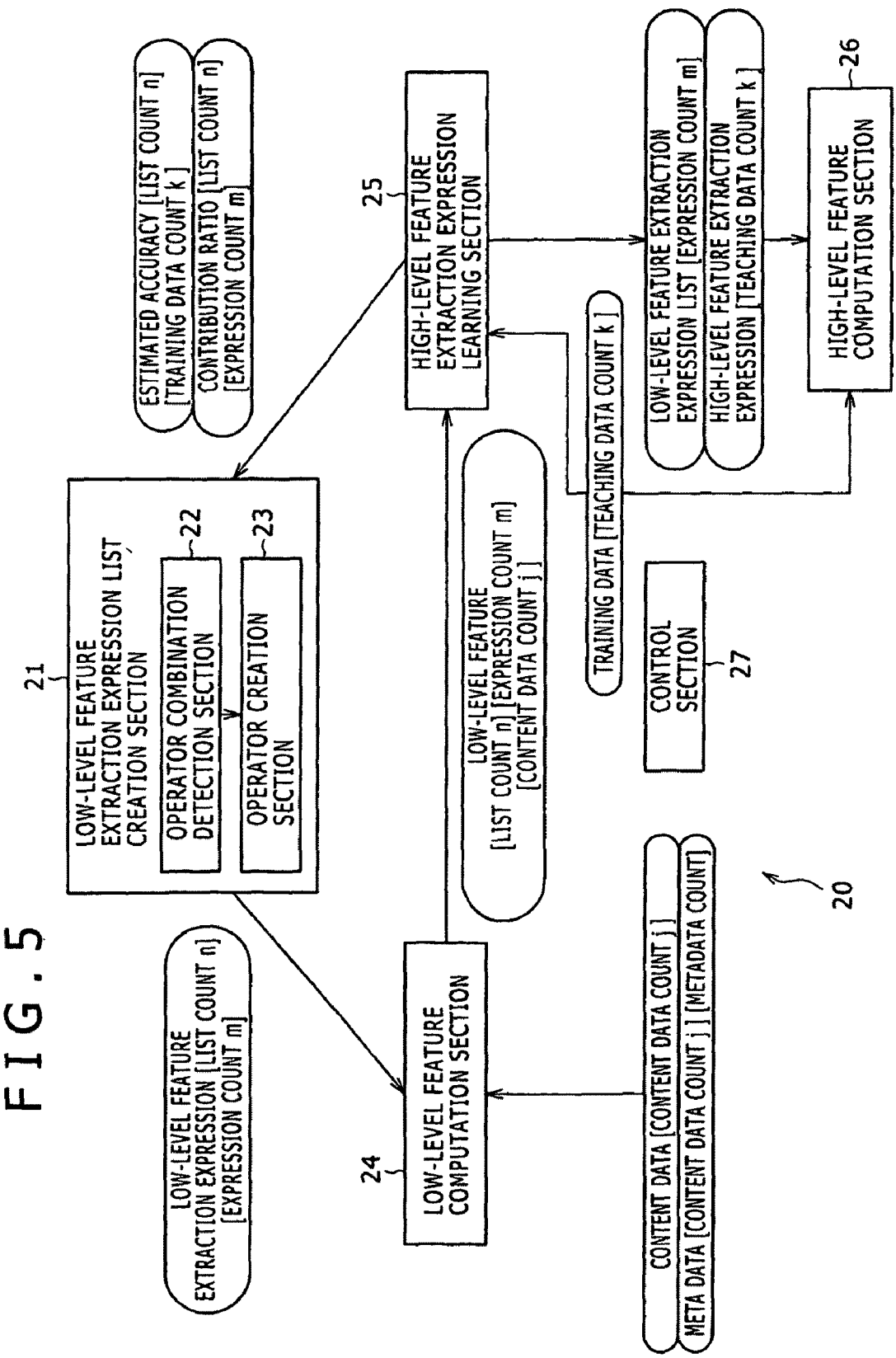

| INPUT DATA | DESCRIPTION | HOLDING DIMENSIONS |
|---|---|---|
| Wav | PCM WAVEFORM DATA | TEMPORAL AND CHANNEL AXES |
| 12tones | PCM WAVEFORM DATA IS ANALYZED ON TEMPORAL AXIS AT INTERVALS | TEMPORAL AND INTERVAL AXES |
| Chord | SONG CHORD PROGRESSION | TEMPORAL AND INTERVAL AXES |
| Key | SONG KEYS | TEMPORAL AND INTERVAL AXES |

FIG.14

Chord: SONG CHORD SIGNAL DATA

24 CHORDS
| Bm | 0 | 0 | 0 | 0 | 18 | 6 | 0 | 0 |
|---|---|---|---|---|---|---|---|---|
| ... | | | | | | | | |
| D | 0 | 0 | 5 | 1 | 22 | 11 | 0 | 0 |
| C# | 0 | 0 | 0 | 0 | 0 | 0 | 0 | 0 |
| C | 100 | 97 | 26 | 13 | 23 | 12 | 85 | 96 |

→ TIME (BEATS)

- EACH LISTED VALUE REPRESENTS THE PROBABILITY OF THE CORRESPONDING CHORD APPEARING DURING THE INDICATED TIME.

FIG.15

Key: SONG KEY DATA

12 KEYS
| B | 0 | 0 | 0 | 0 | 0 | 0 | 0 | 0 |
|---|---|---|---|---|---|---|---|---|
| ... | | | | | | | | |
| D | 0 | 0 | 0 | 0 | 2 | 1 | 0 | 0 |
| C# | 0 | 0 | 0 | 0 | 0 | 0 | 0 | 0 |
| C | 97 | 98 | 99 | 96 | 95 | 97 | 96 | 95 |

→ TIME (BEATS)

- EACH LISTED VALUE REPRESENTS THE PROBABILITY OF THE CORRESPONDING CHORD APPEARING DURING THE INDICATED TIME.

FIG.21A            FIG.21B

EXAMPLE: "Mean" FOR AVERAGING VALUES ON
ON THE DESIGNATED AXIS

| INTERVAL/TIME | 1 | 2 | 3 | 4 | 5 | 6 | 7 | 8 |
|---|---|---|---|---|---|---|---|---|
| B7 | 2 | 3 | 4 | 3 | 3 | 3 | 4 | 4 |
| ... | | | | | | | | |
| D1 | 1 | 2 | 3 | 2 | 3 | 4 | 3 | 2 |
| C#1 | 0 | 0 | 0 | 0 | 1 | 2 | 1 | 0 |
| C1 | 2 | 0 | 0 | 0 | 2 | 0 | 0 | 0 |

⇨ AVERAGED ON TEMPORAL AXIS

| INTERVAL | |
|---|---|
| B7 | 3.25 |
| ... | |
| D1 | 2.5 |
| C#1 | 0.5 |
| C1 | 0.5 |

FIG. 27

Classify (EUCLIDIAN DISTANCE)
THE EUCLIDIAN DISTANCE OF DATA ITEMS FROM THE CENTER
OF EACH CLASS ARE COMPUTED SO THAT THE ITEMS MAY BE
CLASSIFIED INTO THE NEAREST CLASS.

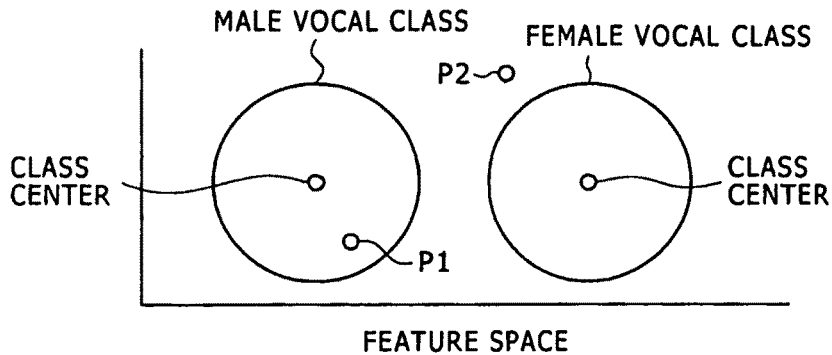

EUCLIDIAN DISTANCE:
X: LOW-LEVEL FEATURE
T: MEAN VALUE OF LOW-LEVEL FEATURE OF TRAINING
   DATA BELONGING TO A PARTICULAR CLASS $$d = \sqrt{(X-T)^T (X-T)}$$

FIG. 28

Classify (VECTOR CORRELATION)
THE CORRELATION OF DATA ITEMS RELATIVE TO THE MEAN
VECTOR OF EACH CLASS ARE COMPUTED SO THAT THE ITEMS
MAY BE CLASSIFIED INTO THE MOST HIGHLY CORRELATED CLASS.

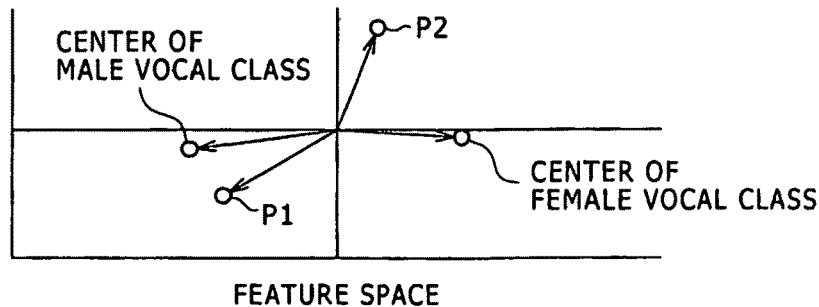

CORRELATION COEFFICIENT:
X: LOW-LEVEL FEATURE
T: MEAN VALUE OF LOW-LEVEL FEATURE OF TRAINING
   DATA BELONGING TO THIS CLASS $$\text{correl} = (X/T^T) / (|X||T|)$$

FIG.29

Classify (MAHALANOBIS DISTANCE)
THE MAHALANOBIS DISTANCES OF DATA ITEMS FROM EACH CLASS ARE COMPUTED SO THAT THE ITEMS MAY BE CLASSIFIED INTO THE NEAREST CLASS.

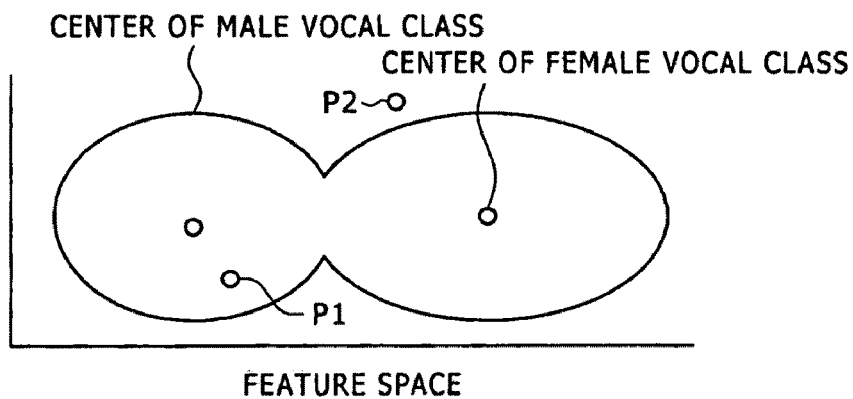

FEATURE SPACE

MAHALANOBIS DISTANCE:
X: LOW-LEVEL FEATURE
$\Sigma$: VARIANCE-COVARIANCE MATRIX OF LOW-LEVEL FEATURE OF TRAINING DATA BELONGING TO THIS CLASS
T: MEAN VALUE OF LOW-LEVEL FEATURE OF TRAINING DATA BELONGING TO THIS CLASS $$d = \sqrt{(X-T)^T \Sigma^{-1} (X-T)}$$

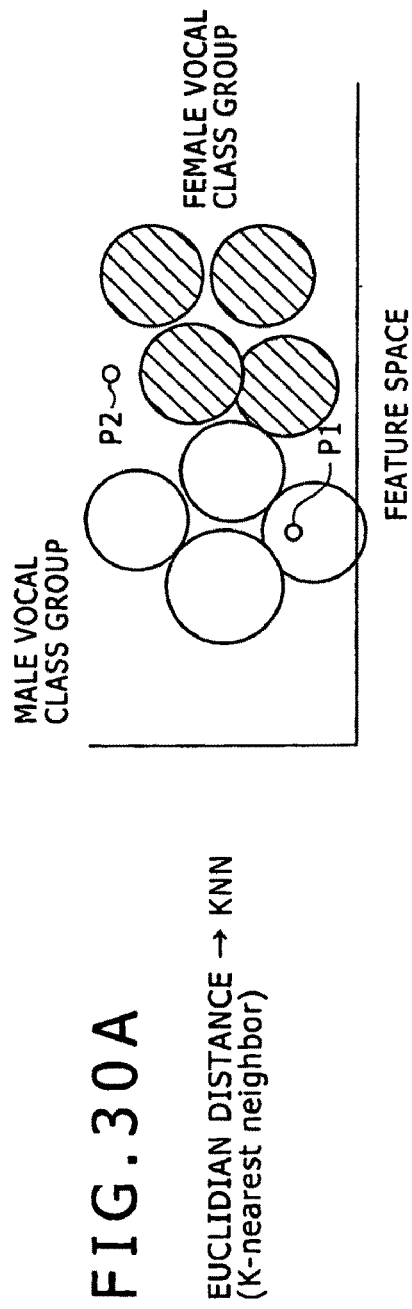
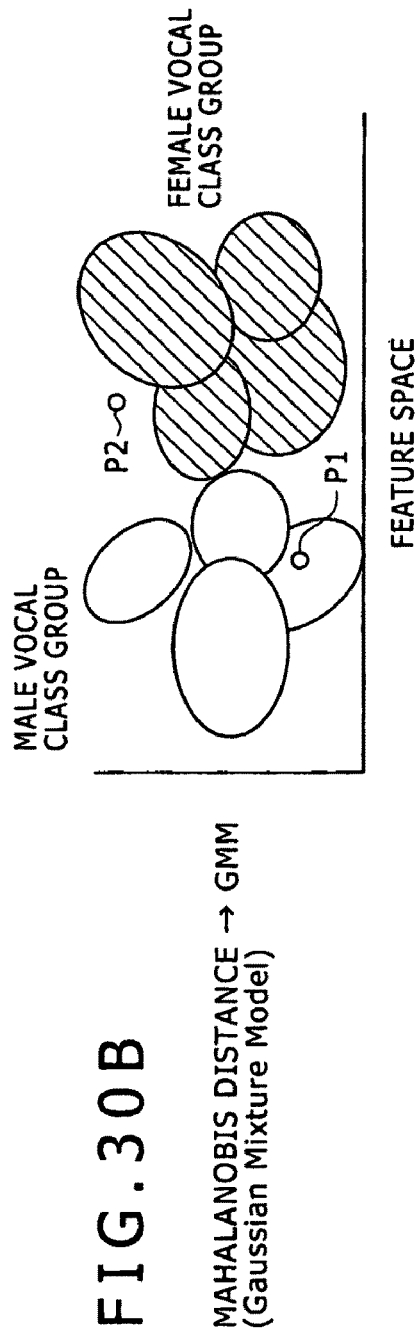

FIG.31

SVM (Support Vector Machine)
THE DISCONTINUOUS PLANE BETWEEN CLASSES IS
REPRESENTED BY SUPPORT VECTORS.
$X_n$: LOW-LEVEL FEATURE, $b_{nm}$: PARAMETER
$X(x, y)$: KERNEL FUNCTION
$Y = b_1 K(b_1, X) + b_3 Y(b_3, X) + \cdots b_0$

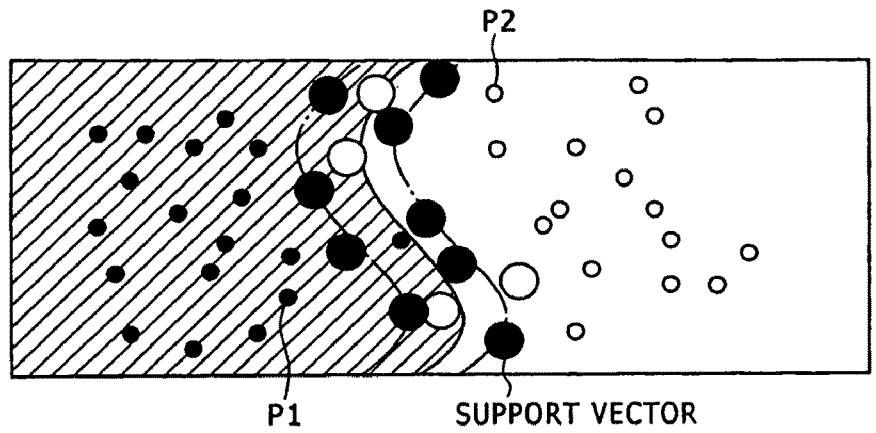

THE PARAMETER $b_{nm}$ IS ESTIMATED SO AS TO MAXIMIZE THE
DISTANCE (MARGIN) BETWEEN THE DISCONTINUOUS PLANE
AND THE VECTORS NEAR THE BOUNDARY.

FIG.32

GP (Genetic Programming)
AN EXPRESSION THAT COMBINES LOW-LEVEL
FEATURE IS CREATED BY GENETIC PROGRAMMING.

TYPICAL EXPRESSION CREATED:
$Y = ((X_2 + 0.4) > X_5) * 0.5 + (X_1 - (X_3/X_8))$

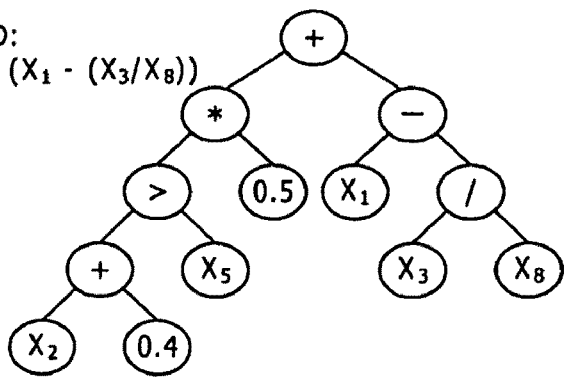

EVALUATION VALUE = CORRELATION BETWEEN TRAINING DATA
AND Y, ETC.

CROSS:

MUTATION:

OTHERS: SHUFFLING OF SIBLING TREES, ETC.

FIG. 35

| |
|---|
| 12Tones, 32#FFT, 16#Mean, 48#StdDev, 32#FFT, Log, 32#FFT, 32#MaxIndex |
| 12Tones M, 16#UVariance, 32#TimeImpression_Tone;0.055, 32#FFT, Log, 32#FFT Log, 32#IndexLRO |
| Chord, 32#FFT, Log, 32#FFT, 16#MMean, 32#TimeImpression_Attack;0.471, 32#IndexLR |
| Key, 16#UVariance, 32#Differential, Log, 32#HPF_1;0.358, 32#TimeImpression_Attack;0.376, Log, 32#FFT, Log, 32#FFT, 3 |
| Key, 32#Differential, 32#FFT, Log, 32#FFT, 16#FFT, 32#UVariance, 16#IndexLRO |
| Key, 32#TimeImpression_Tone;0.479, Log, 32#TimeImpression_Attack;0.893, 16#FFT, 16#UVariance, 32#TimeImpressi |

FIG.36

| 12Tones, 48#UVariance, 32#HPF_1;0.125, Log, 32#Differential, NewOperator1, 16#DownSampling;2.371, 32# |
| 12TonesM, 16#Extract1;0.670, NewOperator1, 32#IndexLR |
| 12TonesM, 16#HPF_1;0.224, 16#HPF_1;0.407, 32#HPF_1;0.246, 16#FFT, NewOperator1, 32#MStdDev, 16#Tim |
| Chord, 16#FFT, NewOperator1, 32#TimeImpression_Attack, 0.038, 16#MaxIndex, 32#TimeImpression_Tone |
| Chord, NewOperator1, Log, 16#HPF_1;0.226, 16#MMean, 32#Mean |

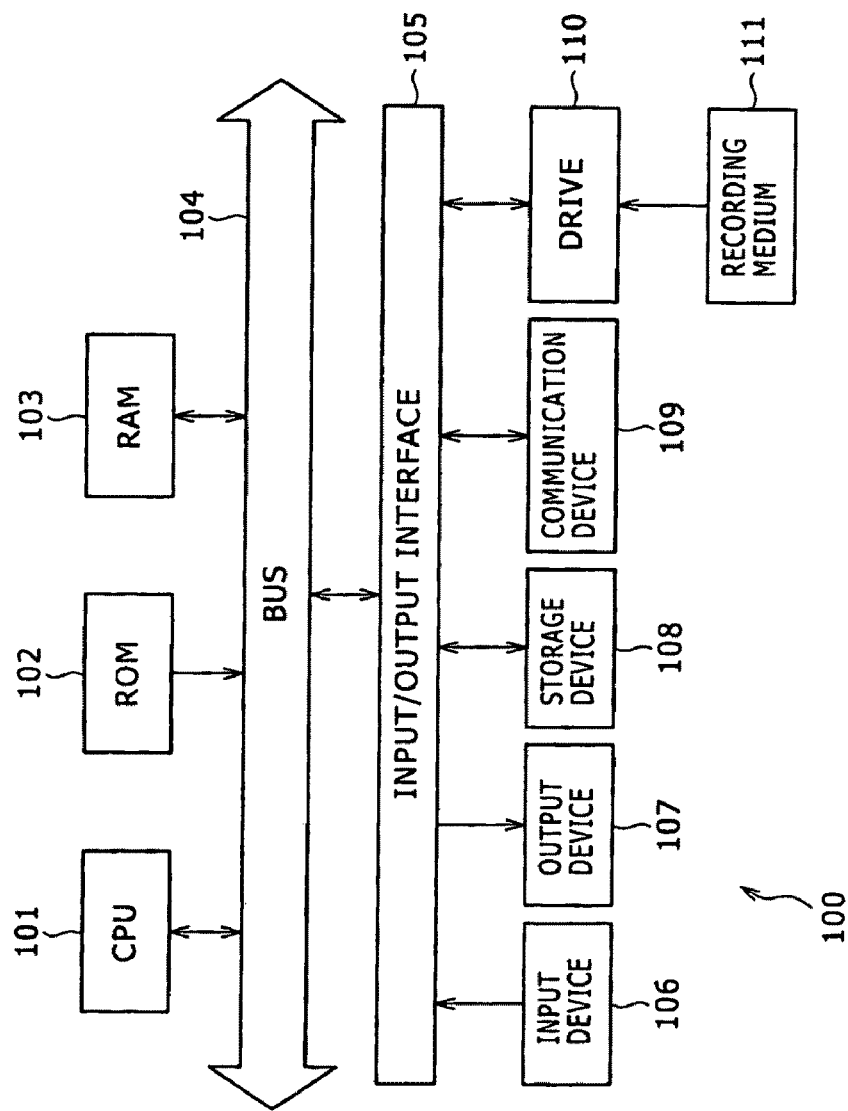

DEVICE, METHOD, AND PROGRAM FOR HIGH LEVEL FEATURE EXTRACTION

TECHNICAL FIELD

The present invention relates to an information processing apparatus, an information processing method, and a program. More particularly, the invention relates to an information processing apparatus, an information processing method, and a program for automatically creating an algorithm used to extract features from content data such as song data.

BACKGROUND ART

There have been proposed inventions regarding the automatic creation of algorithms to which song data is input and front which features (speed, brightness, gaiety, etc. of songs) of the song data are output (e.g., see Patent Document 1.
[Patent Document 1]
U.S. Patent Publication No. 2004/0181401A1

DISCLOSURE OF THE INVENTION

Problems to be Solved by the Invention

The above-cited patent application, as shown in FIG. 1, proposes creating feature extraction algorithms for extracting features by feature type. The computations involved in extracting features are enormous and include numerous redundancies.

It has thus been desired to develop a method for creating an algorithm capable of quickly extracting features from song data through computations with a minimum of redundancies.

The present invention has been made in view of the above circumstances and provides arrangements for creating an algorithm capable of quickly extracting features with high accuracy from input content data such as song data.

Means for Solving the Problems

In carrying out the present invention and according to one embodiment, thereof, there is provided an information processing apparatus which creates a feature detection algorithm for detecting features from content data, the information processing apparatus including: low-level feature extraction expression list creation means for creating next-generation expression lists each constituted by a plurality of low-level feature extraction expressions through learning based on latest-generation expression lists, the low-level feature extraction expressions being expressions to which either the content data or metadata corresponding to the content data is input and from which low-level features are output; computation means for computing the low-level features using the next-generation expression lists created by the low-level feature extraction expression list creation means; and high-level feature extraction expression creation means for creating high-level feature extraction expressions through learning based on training data constituted by previously furnished true high-level features corresponding to the content data, the high-level feature extraction expressions being expressions to which the low-level features computed by the computation means are input and from which high-level features characteristic of the content, data are output.

Preferably, the high-level feature extraction expression creation means may compute at least either accuracy levels of the created high-level feature extraction expressions or contribution ratios of the low-level features in the high-level feature extraction expressions; and the low-level feature extraction expression list creation means may update the low-level feature extraction expressions constituting the low-level feature extraction expression lists at least on the basis of either the accuracy levels of the high-level feature extraction expressions or the contribution ratios of the low-level features in the high-level feature extraction expressions, the accuracy levels and the contribution ratios having been computed by the high-level feature extraction expression creation means.

Preferably, the low-level feature extraction expression list creation means may randomly create first-generation expression lists.

Preferably, the low-level feature extraction expression list creation means may create the next-generation expression lists using a genetic algorithm based on the latest-generation expression lists through at least one of a selection process, a cross process, and a mutation process.

Preferably, the low-level feature extraction expression list creation means may create the next-generation expression lists each constituted by a predetermined constant number of low-level feature extraction expressions.

Preferably, the low-level feature extraction expression list creation means may create the next-generation expression lists each constituted by a predetermined constant number of low-level feature extraction expressions randomly determined every time each of the lists is created.

Preferably, the high-level feature extraction expression creation means may compute at least either evaluation values of the created high-level feature extraction expressions or contribution ratios of the low-level features in the high-level feature extraction expressions; and the low-level feature extraction expression list creation means may update the low-level feature extraction expressions constituting the low-level feature extraction expression lists at least on the basis of either the evaluation values of the high-level feature extraction expressions or the contribution ratios of the low-level features in the high-level feature extraction expressions, the evaluation values and the contribution ratios having been computed by the high-level feature extraction expression creation means.

According to another embodiment of the present invention, there is provided an information processing method for use with an information processing apparatus which creates a feature detection algorithm for detecting features from content data, the information processing method including the steps of: creating next-generation expression lists each constituted by a plurality of low-level feature extraction expressions through learning based on latest-generation expression lists, the low-level feature extraction expressions being expressions to which either the content data or metadata corresponding to the content data is input and from which low-level features are output; computing the low-level features using the created next-generation expression lists; and creating high-level feature extraction expressions through learning based on training data constituted by previously furnished true high-level features corresponding to the content data, the high-level feature extraction expressions being expressions to which the computed low-level features are input and from which high-level features characteristic of the content data are output.

According to a further embodiment of the present invention, there is provided a program for controlling an information processing apparatus which creates a feature detection algorithm for detecting features from content data, the program causing a computer of the information processing apparatus to carry out a procedure including the steps of: creating next-generation expression lists each constituted by a plurality of low-level feature extraction expressions through learning based on latest-generation expression lists, the low-level feature extraction expressions being expressions to which either the content data or metadata corresponding to the content data is input and from which low-level features are output; computing the low-level features using the created next-generation expression lists; and creating high-level feature extraction expressions through learning based on training data constituted, by previously furnished true high-level features corresponding to the content data, the high-level feature extraction expressions being expressions to which the computed low-level features are input and from which high-level features characteristic of the content data are output.

Where any one of the above-outlined embodiments of the present invention is in use, next-generation expression lists each constituted by a plurality of low-level feature extraction expressions are first created through learning based on latest-generation expression lists, the low-level feature extraction expressions being expressions to which either the content data or metadata corresponding to the content data is input and from which low-level features are output. The low-level features are computed using the created next-generation expression lists. High-level feature extraction expressions are then created through learning based on training data constituted by previously furnished true high-level features corresponding to the content data, the high-level feature extraction expressions being expressions to which the computed low-level features are input and from which high-level features characteristic of the content data are output.

Effects of the Invention

The embodiments of the present invention, as outlined above, make it possible to create an algorithm capable of quickly extracting features with high accuracy from input content data such as song data.

BRIEF DESCRIPTION OF THE DRAWINGS

FIG. 3 is a schematic view showing typical low-level feature extraction expressions.
FIG. 5 is a block diagram showing a first structural example of the feature extraction algorithm creation apparatus according to the present invention.
FIG. 14 is a schematic view explanatory of input data "Chord".
FIG. 15 is a schematic view explanatory of input data "Key".
FIG. 21 is a schematic view explanatory of computations using an operator "Mean".
FIG. 27 is a graphic representation explanatory of another learning algorithm.
FIG. 28 is a graphic representation explanatory of another learning algorithm.
FIG. 29 is a graphic representation explanatory of another learning algorithm.
FIG. 30 is a graphic representation explanatory of another learning algorithm.
FIG. 31 is a graphic representation explanatory of another learning algorithm.
FIG. 32 is a graphic representation explanatory of another learning algorithm.
FIG. 35 is a schematic view showing a typical combination of operators.
FIG. 36 is a schematic view showing another typical combination of operators.

FIG. 47 is a block diagram showing a typical structure of a general-purpose personal computer.

DESCRIPTION OF REFERENCE NUMERALS

20 . . . feature extraction algorithm creation apparatus, 21 . . . low-level feature extraction expression list creation section, 22 . . . operator combination detection section, 23 . . . operator creation section, 24 . . . low-level feature computation section, 25 . . . high-level feature extraction expression learning section, 26 . . . high-level feature computation section, 27 . . . control section, 41 . . . low-level feature computation section, 42 . . . high-level feature computation section, 43 . . . square error computation section, 44 . . . reject area extraction expression learning section, 45 . . . feature extraction accuracy computation section, 60 . . . feature extraction algorithm creation apparatus, 61 . . . low-level feature extraction expression list creation section, 62 . . . high-level feature computation section, 100 . . . personal computer, 101 . . . CPU, 111 . . . recording medium

BEST MODE FOR CARRYING OUT THE INVENTION

Preferred embodiments of the present invention will now be described in reference to the accompanying drawings.

Figure 1:
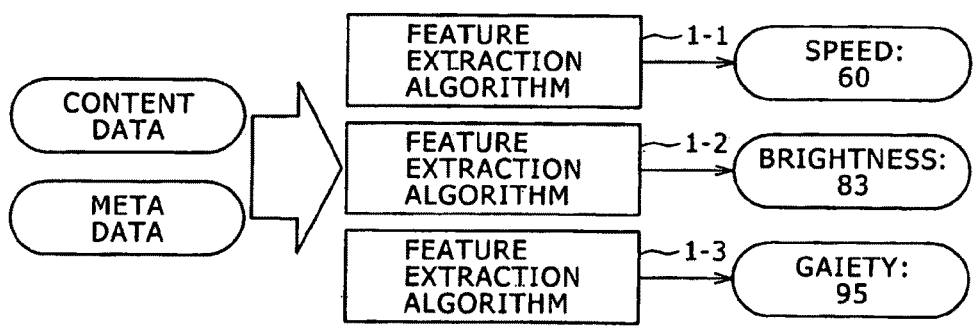
FIG. 1 is a schematic view explanatory of feature extraction algorithms in the past.
Figure 2:
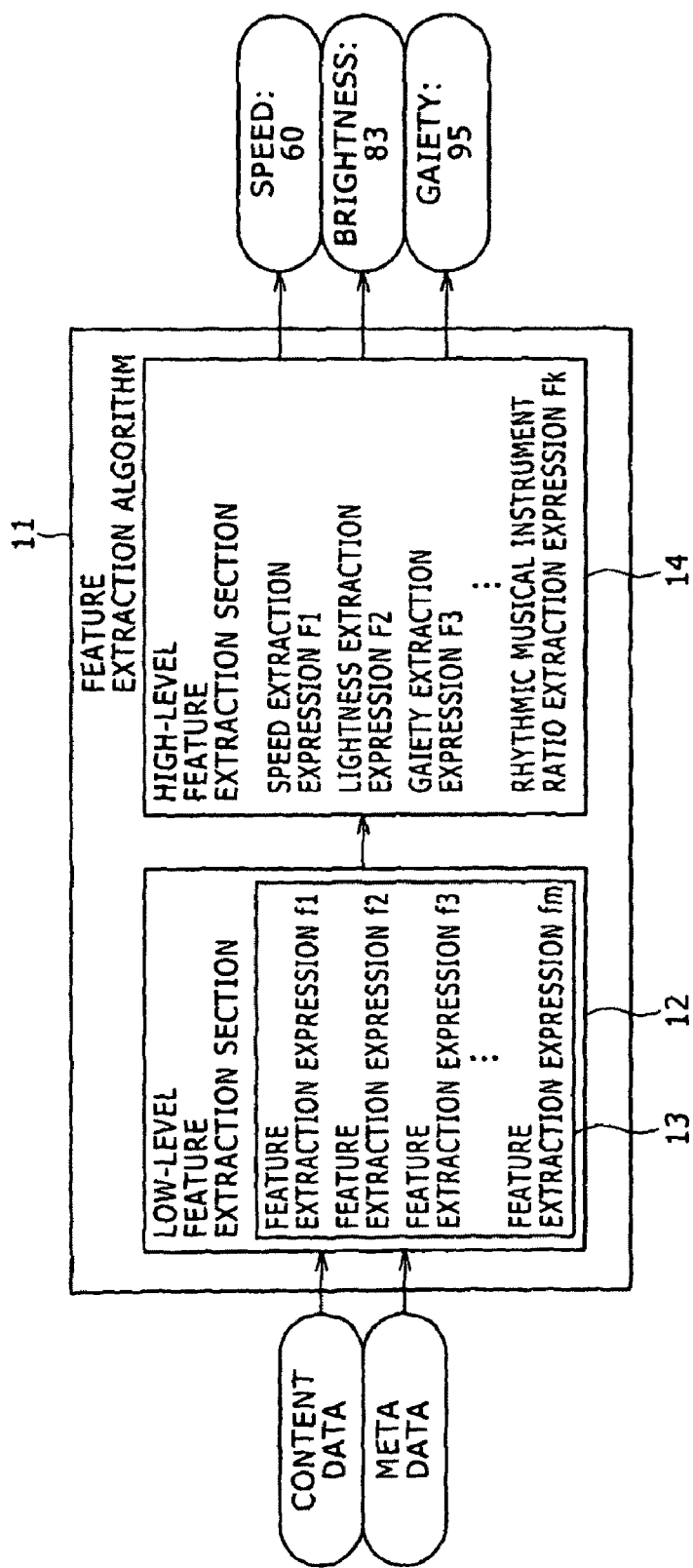
FIG. 2 is a schematic view outlining a feature extraction algorithm created by a feature extraction algorithm creation apparatus according to the present invention.

FIG. 2 is a schematic view outlining a feature extraction algorithm created by a feature extraction algorithm creation apparatus 20 (FIG. 5) or 60 (FIG. 40) according to the present invention.

This feature extraction algorithm 11 is made up of two sections: a low-level feature extraction section 12 to which content data (song data) and metadata (attribute data) corresponding to the content data are input and from which low-level features are output; and a high-level feature extraction section 14 to which the low-level features are input and from which high-level features are output.

The low-level feature extraction section 12 has a low-level feature extraction expression list 13 composed of as many as "m" low-level feature extraction expressions each having a combination of at least one operator by which to perform predetermined operations on input data. The low-level feature extraction section 12 thus outputs "m" low-level features to the high-level feature extraction section 14.

The number "m" of low-level feature extraction expressions constituting the low-level feature extraction expression list 13 is a predetermined constant in the case of the feature extraction algorithm creation apparatus 20 shown in FIG. 5. For the feature extraction algorithm creation apparatus 60 in FIG. 40, the number "m" is a randomly determined number.

FIG. 3 is a schematic view showing typical low-level feature extraction expressions.

Illustratively, a low-level feature extraction expression f1 in part A of FIG. 3 inputs waveform data as one type of song data, computes mean values of the input waveform data between channels involved (e.g., left and right), subjects the computed mean values to fast Fourier transformation (FFT) on the temporal axis, acquires a standard deviation (StDev) of frequency from the FFT result, and outputs the resulting standard deviation as a low-level feature "a."

As another example, a low-level feature extraction expression f2 in part B of FIG. 3 inputs chord progression data as another type of song data, acquires the incidence (ratio) of minor chords on the temporal axis, and outputs the resulting incidence as a low-level feature "b."

The low-level feature output by the low-level feature extraction section 12 need not be a significant value in itself.

The high-level feature extraction section 14 possesses "k" high-level feature extraction expressions that input "m" low-level features, perform relatively simple computations (arithmetic operations, raising to powers, etc.) on at least one of the input "m" low-level features, and output the results of the operations as high-level features. The high-level feature extraction section 14 thus outputs "k" high-level features.

Figure 4A:
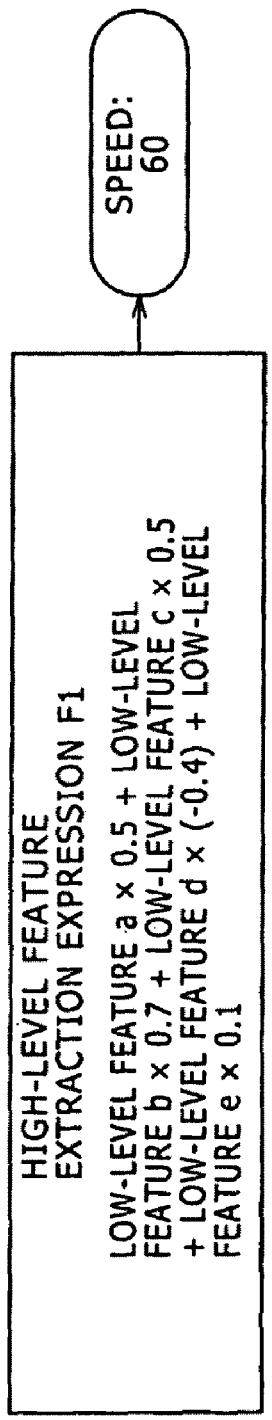
FIG. 4 is a schematic view showing typical high-level feature extraction expressions.
Figure 4B:
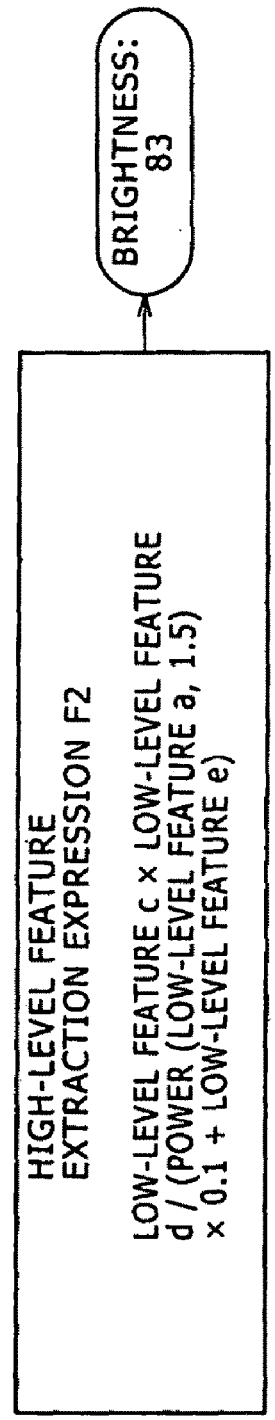

FIG. 4 is a schematic view showing typical high-level feature extraction expressions.

Illustratively, a high-level feature extraction expression F1 in part A of FIG. 4 performs arithmetic operations on low-level features "a," "b," "c," "d" and "e," and outputs the result of the operations as a speed value constituting a single high-level feature.

As another example, a low-level feature extraction expression F2 in part B of FIG. 4 performs arithmetic operations and raising to powers on low-level features "a," "c," "d" and "e," and outputs the result of the operations as a brightness value constituting another single high-level feature.

FIG. 5 is a block diagram showing the first structural example of the feature extraction algorithm creation apparatus 20 according to the present invention.

This feature extraction algorithm creation apparatus 20 creates optimal low-level and high-level feature extraction expressions through learning based on a genetic algorithm.

The feature extraction algorithm creation apparatus 20 is made up of five major sections: a low-level feature extraction expression list creation section 21 that creates "n" low-level feature extraction expression lists each composed of "m" low-level feature extraction expressions; a low-level feature computation section 24 that, inputs input data (content data and metadata) of "j" songs in "n" low-level feature extraction expression lists supplied by the low-level feature extraction expression list creation section 21 and computes "n" combinations of "m" low-level features corresponding to each input data item; a high-level feature extraction expression learning section 25 that estimates high-level feature extraction expressions through learning based on training data ("k" high level features corresponding to each of "j" songs) corresponding to the "n" combinations of low-level features output by the low-level feature computation section 24; a high-level feature computation section 26 that computes a high-level feature using a high-level feature extraction expression eventually created through genetic learning; and a control section 27 that controls loops performed by the sections involved.

In the description that follows, the learning based on a genetic algorithm may also be referred to as genetic learning.

The low-level feature extraction expression list creation section 21 randomly creates low-level feature extraction expression lists each composed of "m" (a predetermined constant) low-level feature extraction expressions for the first generation. For each of the second and subsequent generations, the low-level feature extraction expression list creation section 21 typically creates low-level feature extraction expression lists through learning using the low-level features based on the low-level feature extraction expression lists of the latest generation.

An operator combination detection section 22 incorporated in the low-level feature extraction expression list creation section 21 detects a combination of a plurality of operators that frequently appear in the created low-level feature extraction expressions. An operator creation section 23 registers the combination of multiple operators detected by the operator combination detection section 22 as a new operator.

The high-level feature extraction expression learning section 25 creates "k" high-level feature extraction expressions corresponding to each of "n" low-level features, computes an estimated accuracy level of each of the high-level feature extraction expressions and the contribution ratio of each of the low-level features in each of the high-level feature extraction expressions, and outputs the results of the computations to the low-level feature extraction expression list creation section 21. For the latest generation of learning, the high-level feature extraction expression learning section 25 selects from the "n" low-level feature extraction expression lists "m" low-level feature extraction expressions constituting the low-level feature extraction expression list, having the highest mean accuracy of the acquired high-level features, and supplies the high-level feature computation section 26 with the selected "m" low-level feature extraction expressions along with "k" high-level feature extraction expressions corresponding to the list.

The high-level feature computation section 26 computes a high-level feature using the low-level and high-level feature extraction expressions eventually supplied by the high-level feature extraction expression learning section 25.

Figure 6:
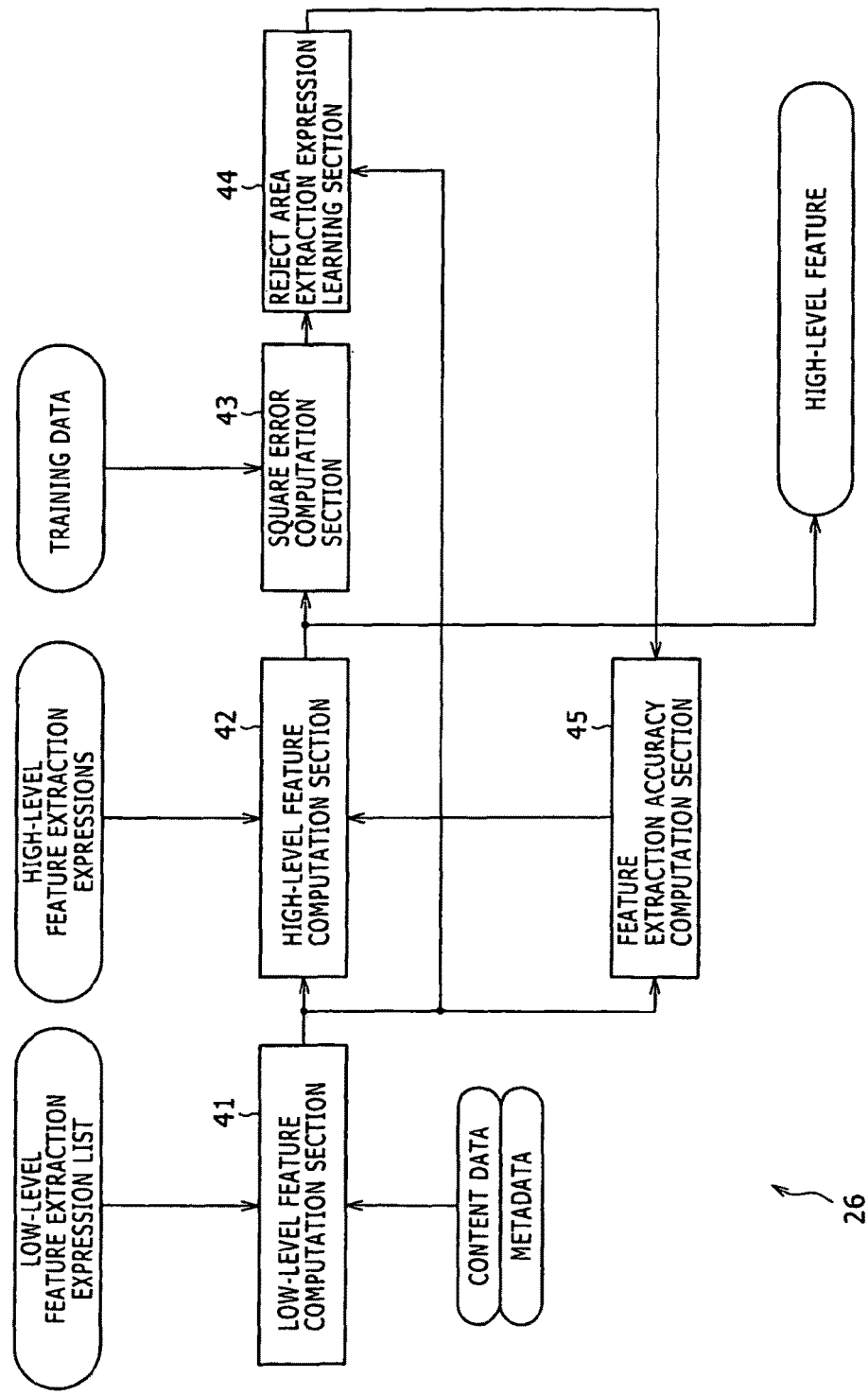
FIG. 6 is a block diagram showing a structural example of a high-level feature computation section constituting part of the feature extraction algorithm creation apparatus.

FIG. 6 is a block diagram showing a detailed structural example of the high-level feature computation section 26.

The high-level feature computation section 26 is made up of five major sections: a low-level feature computation section 41 that computes low-level features by substituting input data (content data and metadata corresponding to the content data) into the eventually acquired low-level feature extraction expression list; a high-level feature computation section 42 that computes a high-level feature by substituting the low-level features computed by the low-level feature computation section 41 into the eventually acquired high-level feature extraction expression; a square error computation section 43 that computes a square error between the high-level feature computed by the high-level feature computation section 42 on the one hand, and training data (true high-level feature corresponding to the input data) on the other hand; a reject area extraction expression learning section 44 that creates through learning a reject area extraction expression to which the low-level features computed by the low-level feature computation section 41 are input and from which the square error computed by the square error computation section 43 is output; and a feature extraction accuracy computation section 45 that substitutes the input data into the reject area extraction expression created by the reject area extraction expression learning section 44, estimates the feature extraction accuracy level (square error) of the high-level feature computed with regard to the input data, and causes the high-level feature computation section 42 to compute the high-level feature only if the estimated feature extraction accuracy level is higher than a predetermined threshold value.

Described below are the workings of the feature extraction algorithm creation apparatus 20 as a first embodiment of the present invention.

Figure 7:
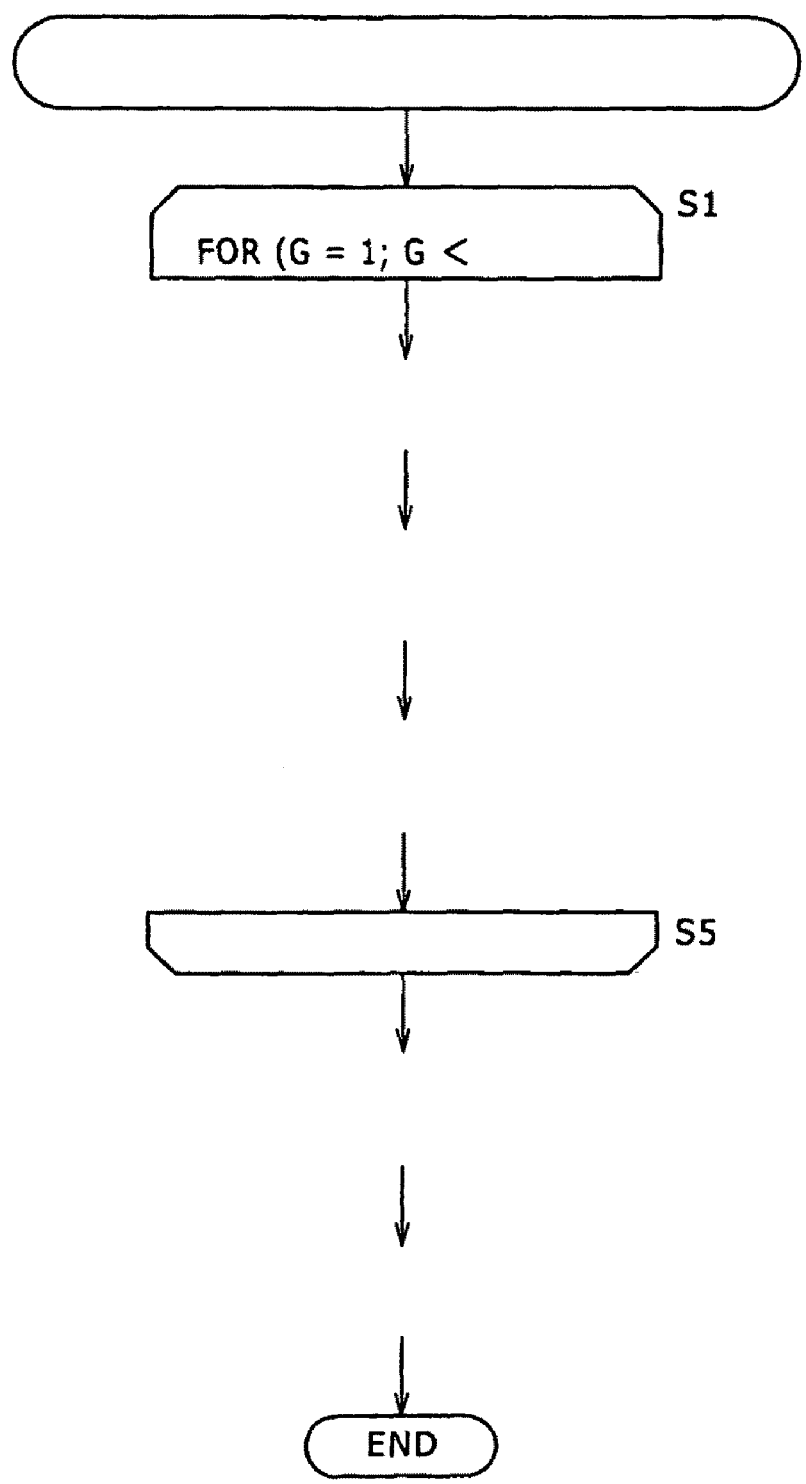
FIG. 7 is a flowchart of steps constituting a feature extraction algorithm learning process.

FIG. 7 is a flowchart of steps constituting a feature extraction algorithm creation process. This is the basic operation of the feature extraction algorithm creation apparatus 20.

In step S1, the control section 21 starts a learning loop by initializing a learning loop parameter G to "1." The learning loop is repeated as many times as a predetermined learning count "g."

Figure 8:
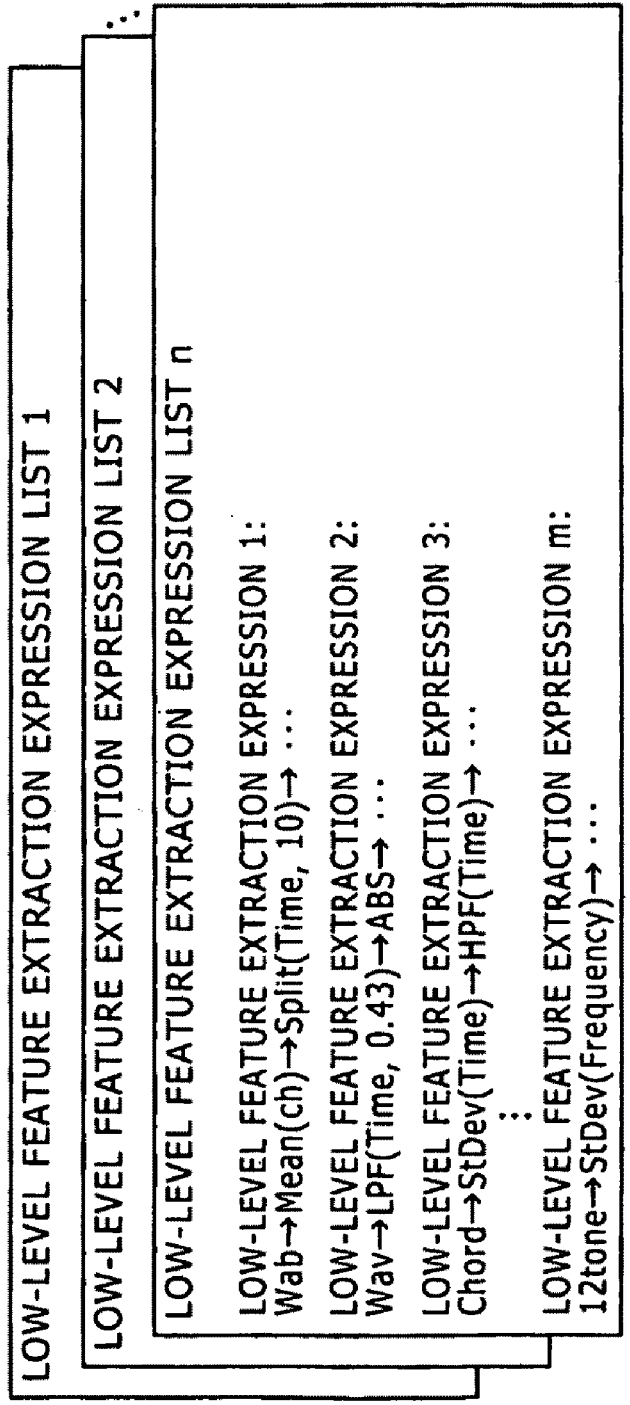
FIG. 8 is a schematic view showing typical low-level feature extraction expression lists.

In step S2, the low-level feature extraction expression list creation section 21 creates "n" low-level feature extraction expression lists each composed of "m" low-level feature extraction expressions and outputs the created lists to the low-level feature computation section 24, as shown in FIG. 8.

Figure 9:
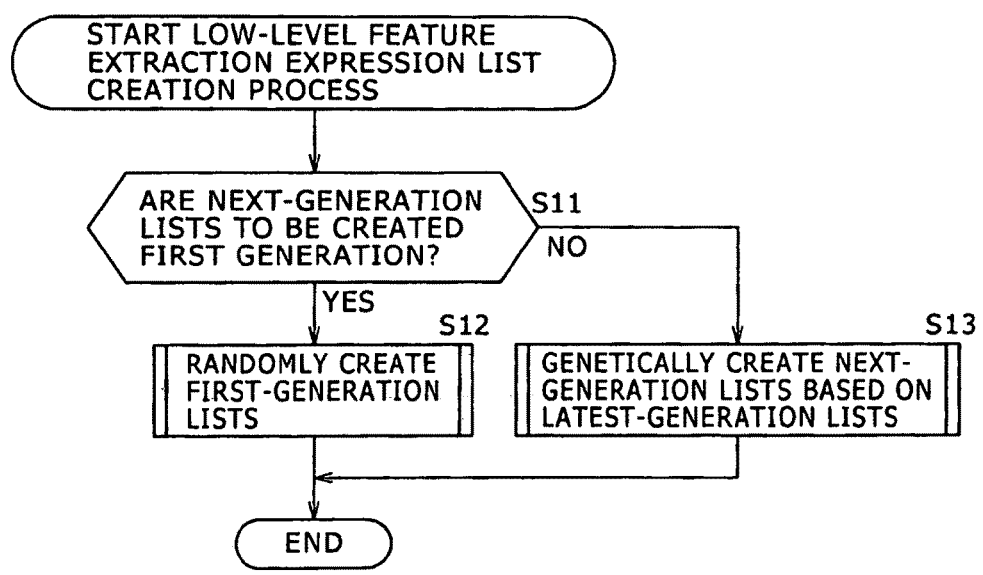
FIG. 9 is a flowchart of steps constituting a low-level feature extraction expression list creation process.

The process of step S2 (i.e., low-level feature extraction expression list creation process) is described below in detail with reference to the flowchart of FIG. 9.

In step S11, the low-level feature extraction expression list creation section 21 checks to determine whether the low-level feature extraction expression lists to be crated are of the first generation. If the learning loop parameter G is set to "0," then the low-level feature extraction expression lists to foe crated are found to be of the first generation.

When the low-level feature extraction expression lists to be crated are found to be of the first generation because the learning loop parameter 6 is set to "0," step S12 is reached. In step S12, the low-level feature extraction expression list creation section 21 randomly creates low-level feature extraction expression lists of the first generation.

By contrast, if the low-level feature extraction expression lists to be crated are not found to be of the first generation, then step S13 is reached. In step S13, the low-level feature extraction expression list creation section 21 genetically creates low-level feature extraction expression lists of the next generation using a genetic algorithm based on the low-level feature extraction expression lists of the latest generation.

The process of step S12 (i.e., first-generation list random creation process) is described below in detail with reference to the flowchart of FIG. 10.

In step S21, the control section 27 starts a list loop by initializing a list loop parameter N to "1." The list loop is repeated as many times as a predetermined list count "n."

In step S22, the control section 2 starts an expression loop by initialising an expression loop parameter M to "1." The expression loop is repeated as many times as the number "m" of low-level feature extraction expressions constituting a single low-level feature extraction expression list.

Figure 11:
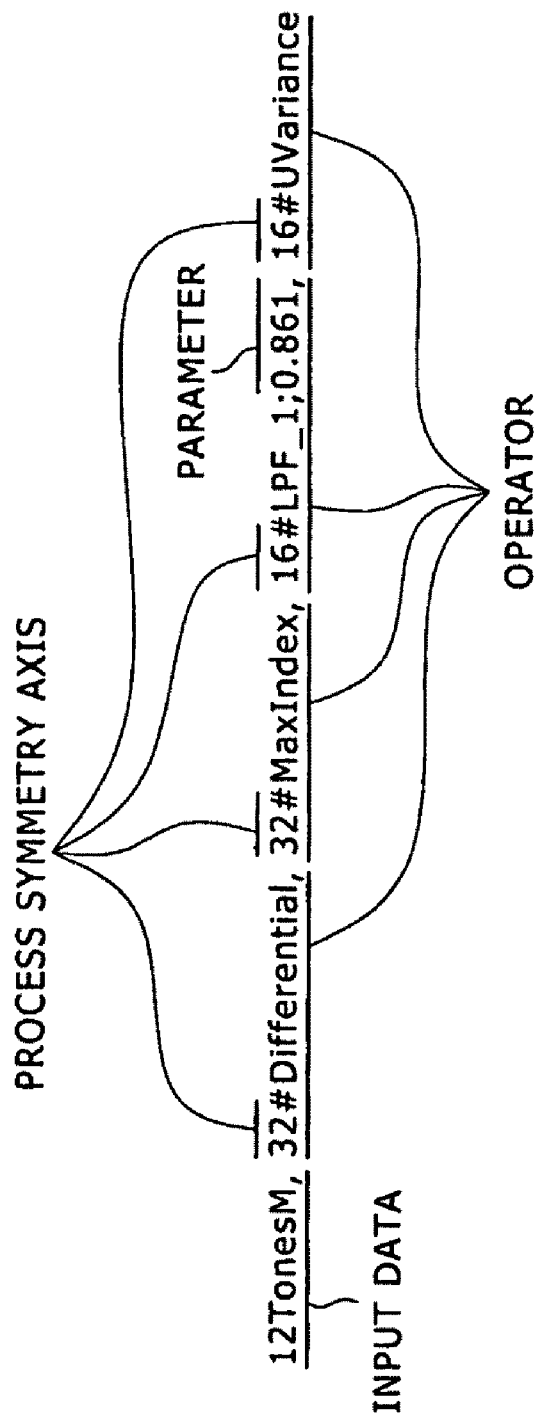
FIG. 11 is a schematic view showing how a low-level feature extraction expression is typically described.

Explained below in reference to FIG. 11 is how a low-level feature extraction expressions created during the expression loop is typically described.

Input data is described in the leftmost position of the low-level feature extraction expression. To the right of the input data are one or a plurality of operators described in the order in which they are subject to computation. Each operator may include a process symmetry axis and a parameter as needed.

In the case of the low-level feature extraction expression shown in FIG. 11, the input data is "12TonesM," and the operators are "32#Differential," "32#MaxIndex," "16#LPF_;0.861," etc. Illustratively, the input data "12TonesM" indicates that monaural PCM (pulse coded modulation sound source) waveform data appears in the temporal axis direction. The notation "48#" stands for the channel axis, "32#" for the frequency and interval axes, and "16#" for the temporal axis. The parameter "0.861" in an operator applies to low-pass filtering and illustratively represents a threshold frequency for the filtering process.

Figure 10:
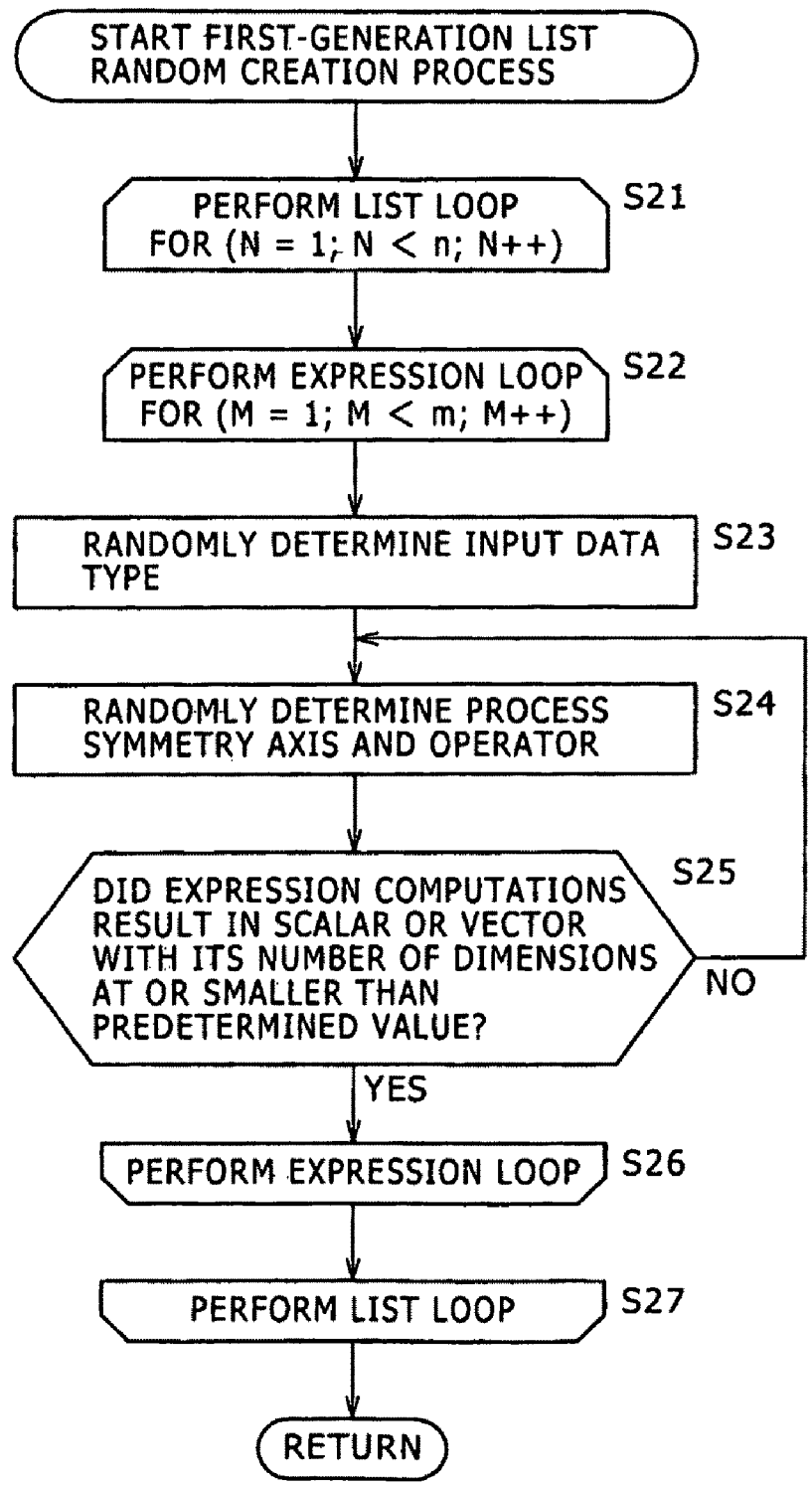
FIG. 10 is a flowchart of steps constituting a first-generation list random creation process performed by a low-level feature extraction expression list creation section as part of the structure in FIG. 5.

In step S23 back in FIG. 10, the low-level feature extraction expression list creation section 21 randomly determines the input data, for the M-th low-level feature extraction expression (also referred to as the low-level feature extraction expression M hereunder) in the N-th low-level feature extraction expression list (also called the list N hereunder) to be created.

Figures 12, 13:
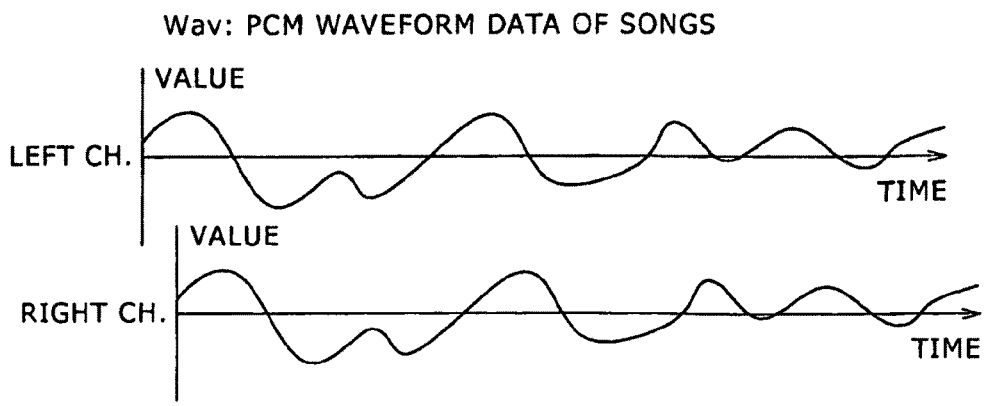
FIG. 12 is a tabular view listing examples of input data.
FIG. 13 is a schematic view explanatory of input data "Wav".

The typical input data types may include "Wav," "12Tones," "Chord," and "Key," as shown in FIG. 12.

The input data "WAV" is PCM waveform data such as that shown in FIG. 13, and the holding dimensions involved are the temporal and channel axes. The input data "12Tones" is PCM waveform data analysed by interval on the temporal axis, and the holding dimensions are the temporal and interval axes. The input data "Chord" represents a song chord progression (C, C#, D, ..., Bm) such as that shown in FIG. 14, and the holding dimensions are the temporal and interval axes. The input data "Key" denotes song keys (C, C#, D, ..., B), and the holding dimensions are the temporal and interval axes.

In step S24 back in FIG. 10, the low-level feature extraction expression list creation section 21 randomly determines a process symmetry axis and a parameter for the low-level feature extraction expression M in the list N to be created.

The parameter types may include mean value (Mean), fast Fourier transformation (FFT), standard deviation (StDev), incidence (Ratio), low-pass filter (LET), high-pass filter (HPF), absolute value (ABS), differentiation (Differential), maximum value (MaxIndex), and unbiased variance (UVariance). The process symmetry axis may turn out to be fixed for a particular operator that has been determined. In such a case, the process symmetry axis fixed to the parameter in the operator of interest is adopted. If a determined operator turns out to demand a particular parameter, that parameter is set to either a random value or a predetermined value.

Figure 16:
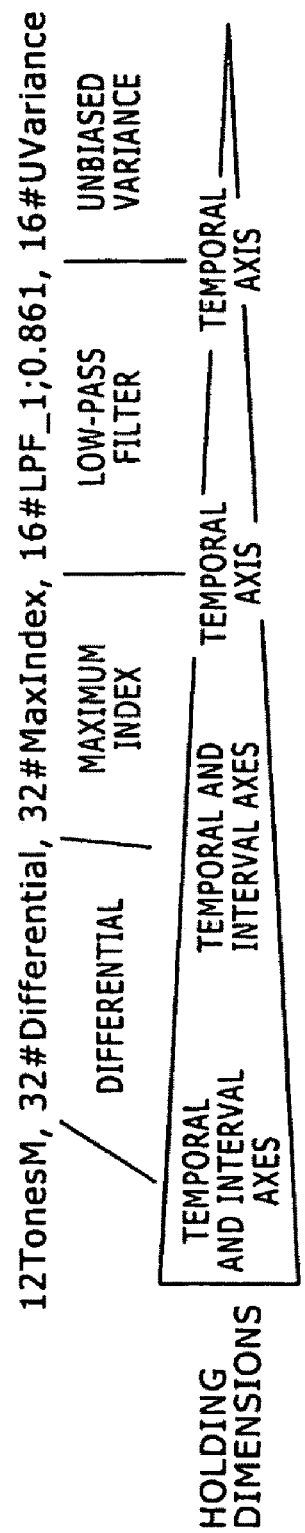
FIG. 16 is a schematic view explanatory of holding dimensions for a low-level feature extraction expression.

In step S25, the low-level feature extraction expression list creation section 21 checks to determine whether the result of the computation by the low-level feature extraction expression M in the list N created up to that point in time is either a scalar (one-dimensional) or at most a predetermined number of dimensions (e.g., small number such as 1 or 2). If the result of the check in step S25 is negative, then step S24 is reached again and one more operator is added. With steps S24 and S25 repeated, the number of holding dimensions in the computed result decreases as shown in FIG. 16. If in step S25 the result of the computation by the low-level feature extraction expression M in the list N is either a scalar or at most a predetermined small number of dimensions (e.g., 1 or 2), then step S26 is reached.

In step S26, the control section 27 checks to determine whether the expression loop parameter M is smaller than a maximum value "m." If the expression loop parameter M is found to be smaller than the maximum value "m," then the parameter M is incremented by "1" and step S23 is reached again. Conversely, if the expression loop parameter M is not found to be smaller than the maximum value "m" (i.e., if the parameter M is equal to the maximum value "m"), then the expression loop is exited and step S27 is reached. The N-th low-level feature extraction expression list is thus created by the processing up to this point.

In step S27, the control section 27 checks to determine whether the list loop parameter M is smaller than a maximum value "n." If the list loop parameter N is found to be smaller than the maximum value "n," then the parameter N is incremented by "1" and step S22 is reached again. On the other hand, if the list loop parameter N is not found to be smaller than the maximum value "n" (i.e., if the parameter N is equal to the maximum value "n"), then the list loop is exited and the first-generation list random creation process is terminated. As many as "n" low-level feature extraction expression lists of the first generation are thus created by the processing up to this point.

Figure 17:
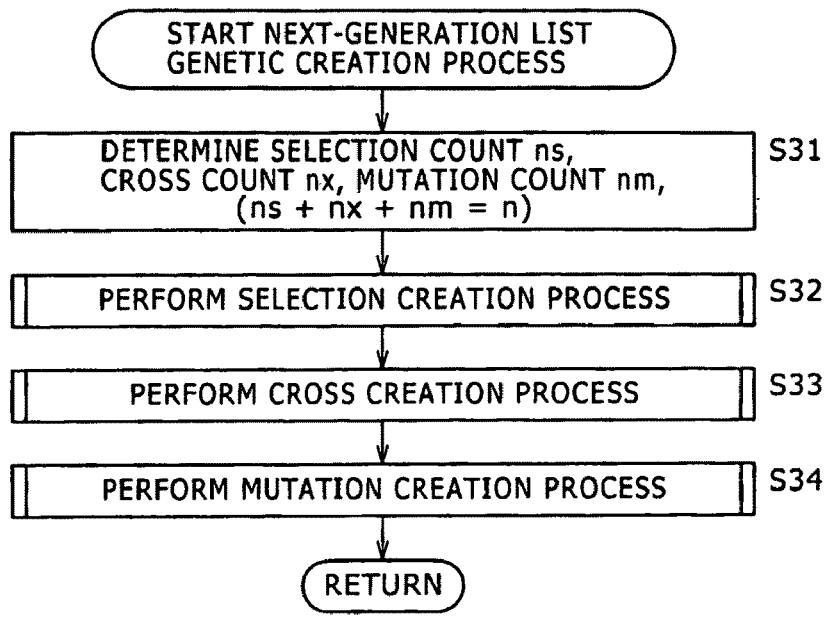
FIG. 17 is a flowchart of steps constituting a next-generation list genetic creation process.

Described below in detail with reference to the flowchart of FIG. 17 is the process for creating low-level feature extraction expression lists of the second and subsequent generations (i.e., nest-generation list genetic creation process) in step S13 of FIG. 9.

In step S31, the low-level feature extraction expression list creation section 21 randomly determines three numbers: a selection count "ns" representing the number of lists to which genetic algorithm selection is applied out of the "n" low level feature extraction expression lists to be created; a cross count "nx" denoting the number of lists to which genetic algorithm crossing is applied; and a mutation count "nm" indicating the number of lists to which genetic algorithm mutation is applied. The total sum of the selection count "ns," cross count "nx," and mutation count "nm" is equal to "n." Alternatively, the selection count "ns," cross count "nx," and mutation count "nm" may each be a predetermined constant.

In step S32, the low-level feature extraction expression list creation section 21 creates as many as "ns" low-level feature extraction expression lists using the low-level feature extraction expression lists amounting to the selection count "ns" determined out of the "n" low-level feature extraction expression lists of the latest generation. In step S33, the low-level feature extraction expression list creation section 21 creates as many as "nx" low-level feature extraction expression lists using the low-level feature extraction expression lists amounting to the cross count "nx" determined out of the "n" low-level feature extraction expression lists of the latest generation. In step S34, the low-level feature extraction expression list creation section 21 creates as many as "nm" low-level feature extraction expression lists using the low-level feature extraction expression lists amounting to the mutation count "nm" determined out of the "n" low-level feature extraction expression lists of the latest generation.

The process in each of steps S32 through S34 is described below in detail.

Figure 18:
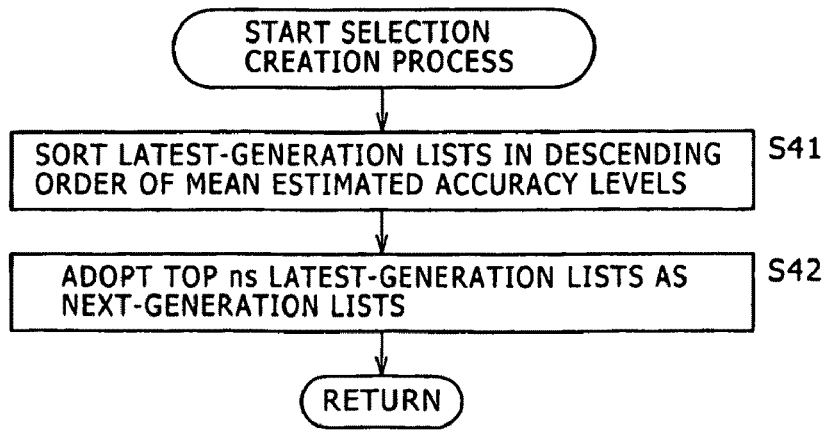
FIG. 18 is a flowchart of steps constituting a selection creation process performed by the low-level, feature extraction expression list creation section as part of the structure in FIG. 5.

The selection creation process of step S32 will now be described in detail with reference to the flowchart of FIG. 18. This selection creation process creates the low-level feature extraction expression lists amounting to the selection count "ns" out of the "n" low-level feature extraction expression lists of the next generation.

In step S41, the low-level feature extraction expression list creation section 21 sorts the "n" low-level feature extraction expression lists of the latest generation in descending order of the mean estimated accuracy levels of the high-level feature extraction expressions input from the high-level feature extraction expression learning section 25. In step S42, the low-level feature extraction expression list creation section 21 adopts the top "ns" low-level feature extraction expression lists from the sorted "n" low-level feature extraction expression lists of the latest generation as the low-level feature extraction expression lists of the next generation. This brings the selection creation process to an end.

Figure 19:
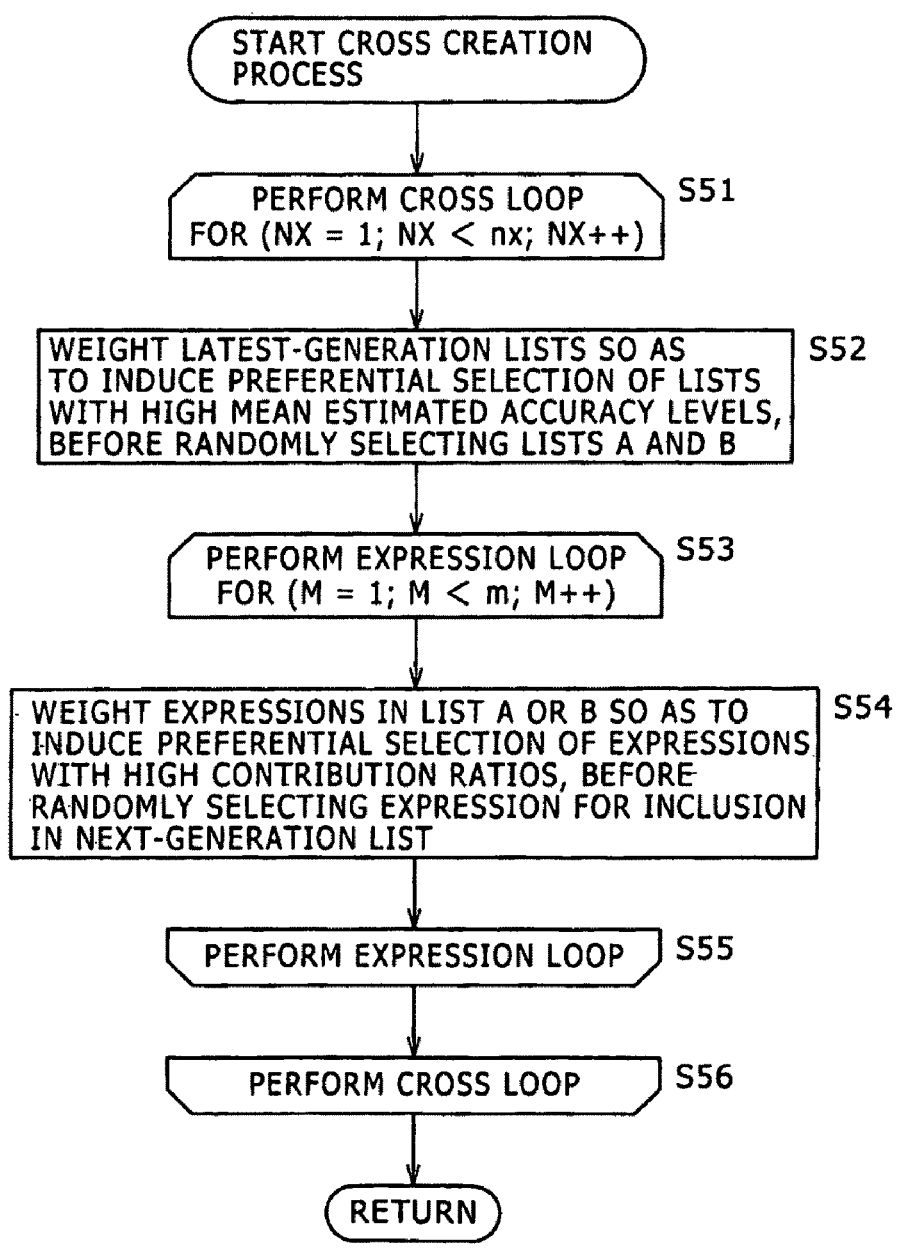
FIG. 19 is a flowchart of steps constituting a cross creation process performed by the low-level feature extraction expression list creation section as part of the structure in FIG. 5.

The cross creation process of step S33 in FIG. 17 will now be described in detail with reference to the flowchart of FIG. 19. This cross creation process creates the low-level feature extraction expression lists amounting to the cross count "nx" out of the "n" low-level feature extraction expression lists of the next generation.

In step S51, the control section 27 starts a cross loop by initializing a cross loop parameter NX to "1." The cross loop is repeated as many times as the cross count "nx."

In step S52, the low-level feature extraction expression list creation section 21 weights the low-level feature extraction expression lists of the latest generation so as to induce preferential section of the lists in descending order of the mean estimated accuracy levels of the high-level feature extraction expressions output by the high-level feature extraction expression learning section 25, before randomly selecting two low-level feature extraction expression lists A and B. During the selection of this process, the "ns" low-level feature extraction expression lists selected by the above-described selection creation process may be either excluded from the candidate lists or may be left intact as part, of the candidate lists.

In step S53, the control section 27 starts the expression loop by initializing the expression loop parameter M to "1." The expression loop is repeated as many times as the number "m" of expressions included in a single low-level feature extraction expression list.

In step S54, the low-level feature extraction expression list creation section 21 weights the "2m" low-level feature extraction expressions in the low-level feature extraction expression lists A and B so as to induce preferential section of the expressions in descending order of the contribution ratios of the high-level feature extraction expressions output by the high-level feature extraction expression learning section 25, before randomly selecting a single low-level feature extraction expression for inclusion in a low-level feature extraction expression list of the next generation.

In step S55, the control section 27 checks to determine whether the expression loop parameter M is smaller than the maximum value "m." If the expression loop parameter M is found to be smaller than the maximum value "m," then the parameter M is incremented by "1" and step S54 is reached again. Conversely, if the expression loop parameter M is not found to be smaller than the maximum value "m" (i.e., if the parameter M is equal to the maximum value "m"), then the expression loop is exited and step S56 is reached. A single low-level feature extraction expression list is thus created in steps S53 through S55 constituting the expression loop.

In step S56, the control section 27 checks to determine whether the cross loop parameter NX is smaller than the maximum value "nx." If the cross loop parameter NX is found to foe smaller than the maximum value "nx," then the parameter NX is incremented by "1" and step S52 is reached again. On the other hand, if the cross loop parameter NX is not found to be smaller than the maximum value "nx" (i.e., if the parameter NX is equal to the maximum value "nx"), then the cross loop is exited and the cross creation process is terminated. The low-level feature extraction expression lists amounting to the cross count "nx" are thus created by the cross loop that has been executed.

Figure 20:
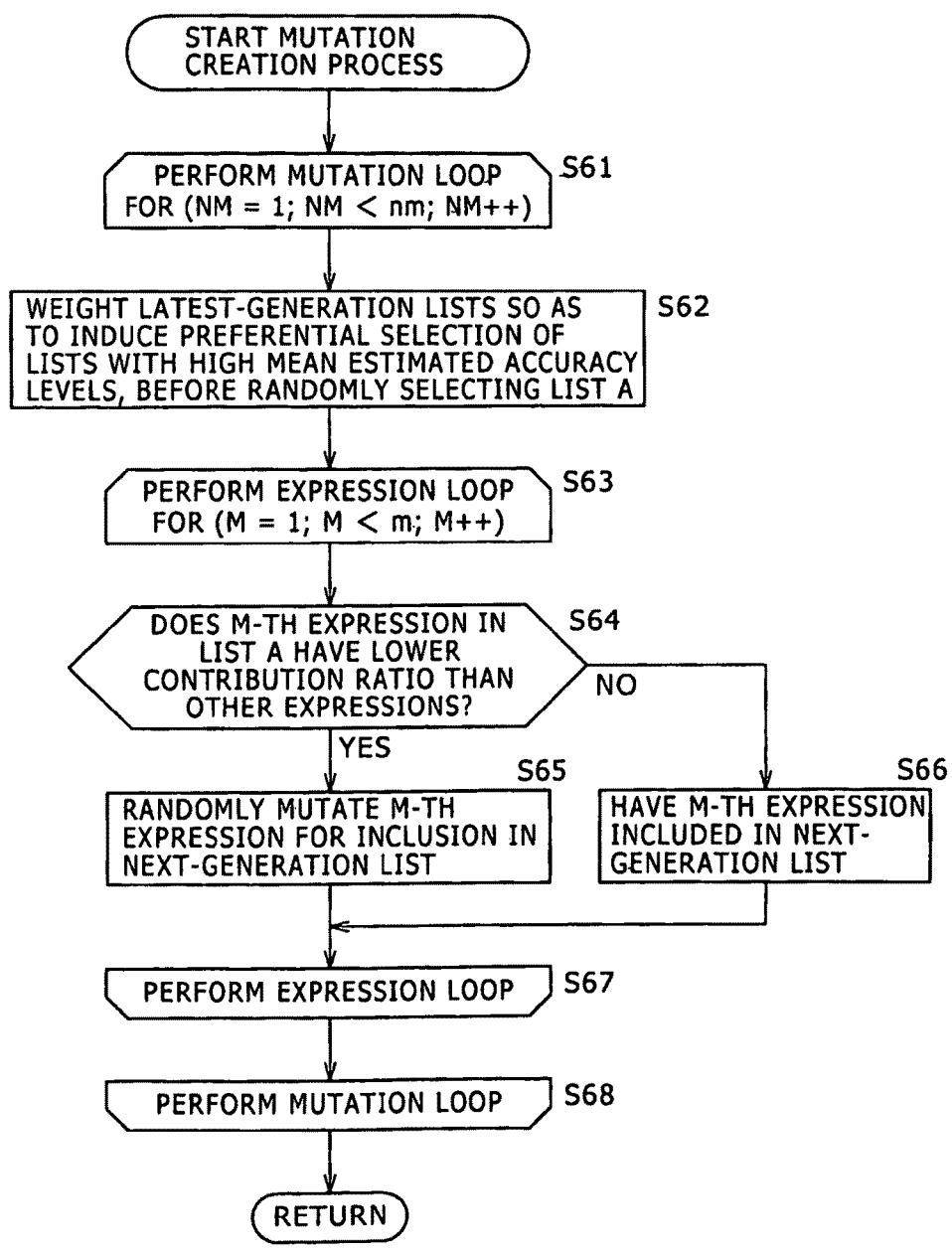
FIG. 20 is a flowchart of steps constituting a mutation creation process performed by the low-level feature extraction expression list creation section as part of the structure in FIG. 5.

The mutation creation process of step S34 in FIG. 17 will now be described in detail with reference to the flowchart of FIG. 20. This mutation creation process creates the low-level feature extraction expression lists amounting to the mutation count "nm" out of the "n" low-level feature extraction expression lists of the next generation.

In step S61, the control section 27 starts a mutation loop by initializing a mutation loop parameter NM to "1." The mutation loop is repeated as many times as the mutation count "nm."

In step S62, the low-level feature extraction expression list creation section 21 weights the low-level feature extraction expression lists of the latest generation so as to induce preferential section of the lists in descending order of the mean estimated accuracy levels of the high-level feature extraction expressions output by the high-level feature extraction expression learning section 25, before randomly selecting a single low-level feature extraction expression list A. During the selection of this process, the "ns" low-level feature extraction expression lists selected by the above-described selection creation process may be either excluded from the candidate lists or may be left intact as part of the candidate lists. Likewise, the low-level feature extraction expression lists selected in step S52 of the cross creation process above may be either excluded from the candidate lists or may be left intact as part of the candidate lists.

In step S63, the control section 2 starts the expression loop by initialising the expression loop parameter M to "1." The expression loop is repeated as many times as the number "m" of expressions included in a single low-level feature extraction expression list.

In step S64, the low-level feature extraction expression list creation section 21 checks to determine whether the contribution ratio of the low-level feature computed using the M-th low-level feature extraction expression out of "m" low-level feature extraction expressions in the low-level feature extraction expression list A is lower than the contribution ratios of the low-level features computed using the other low-level feature extraction expression expressions in the low-level feature extraction expression list A. More specifically, a check is made to determine whether the contribution ratio of the low-level feature computed using the M-th low-level feature extraction expression is lower than a predetermined ratio in sequence of the contribution ratios computed using the "m" low-level feature extraction expressions in the low-level feature extraction expression list A.

If in step S64 the contribution ratio of the low-level feature computed using the M-th low-level feature extraction expression is found to be lower than the others, then step S65 is reached. In step S65, the low-level feature extraction expression list, creation section 21 randomly mutates the M-th low-level feature extraction expression for inclusion in the low-level feature extraction expression list of the next generation.

If in step S64 the contribution ratio of the low-level feature computed using the M-th low-level feature extraction expression is not found to be lower than the others, then step S66 is reached. In step S66, the low-level feature extraction expression list, creation section 21 adds the M-th low-level feature extraction expression to the low-level feature extraction expression list of the next generation without mutating the expression in question.

In step S67, the control section 27 checks to determine whether the expression loop parameter M is smaller than the maximum value "m." If the expression loop parameter M is found to be smaller than the maximum value "m," then the expression loop parameter M is incremented by "1" and step S64 is reached again. On the other hand, if the expression loop parameter M is not found to be smaller than the maximum value "m" (i.e., if the parameter M is equal to the maximum value "m"), then the expression loop is exited and step S68 is reached. A single low-level feature extraction expression list is thus created in steps S63 through S67 constituting the expression loop.

In step S68, the control section 27 checks to determine whether the mutation loop parameter NM is smaller than the maximum value "nm." If the mutation loop parameter NM is found to be smaller than the maximum value "nm," then the mutation loop parameter NM is incremented by "1" and step S62 is reached again. On the other hand, if the mutation loop parameter NM is not found to be smaller than the maximum value "nm" (i.e., if the parameter NM is equal to the maximum value "nm"), then the mutation loop is exited and the mutation creation process is terminated. The low-level feature extraction expression lists amounting to the mutation count "nm" are thus created by the processing up to this point.

According to the above-described next-generation list genetic creation process, the low-level feature extraction expression lists of the latest generation which have high estimated accuracy levels are transmitted to the next generation and so are the low-level feature extraction expressions of the latest generation which have high contribution ratios. Those with low estimated accurate levels and contribution ratios are discarded without being transmitted to the next generation. That is, as generations progress, the estimated accuracy levels of the low-level feature extraction expression lists are expected to improve and so are the contribution ratios of the low-level feature extraction expressions.

Returning to FIG. 7, the low-level feature extraction expression lists of the next generation created as discussed above are output by the low-level feature extraction expression list creation section 21 to the low-level feature computation section 24. In step S3, the low-level, feature computation section 24 computes low-level features by substituting the input data (content data and metadata) of "j" songs C1 through Cj into each of "n" low-level feature extraction expression lists input from the low-level feature extraction expression list creation section 21.

It is assumed that the input data items of the "j" songs are each furnished beforehand with as many as "k" training data items (i.e., corresponding high-level features).

Figure 22:
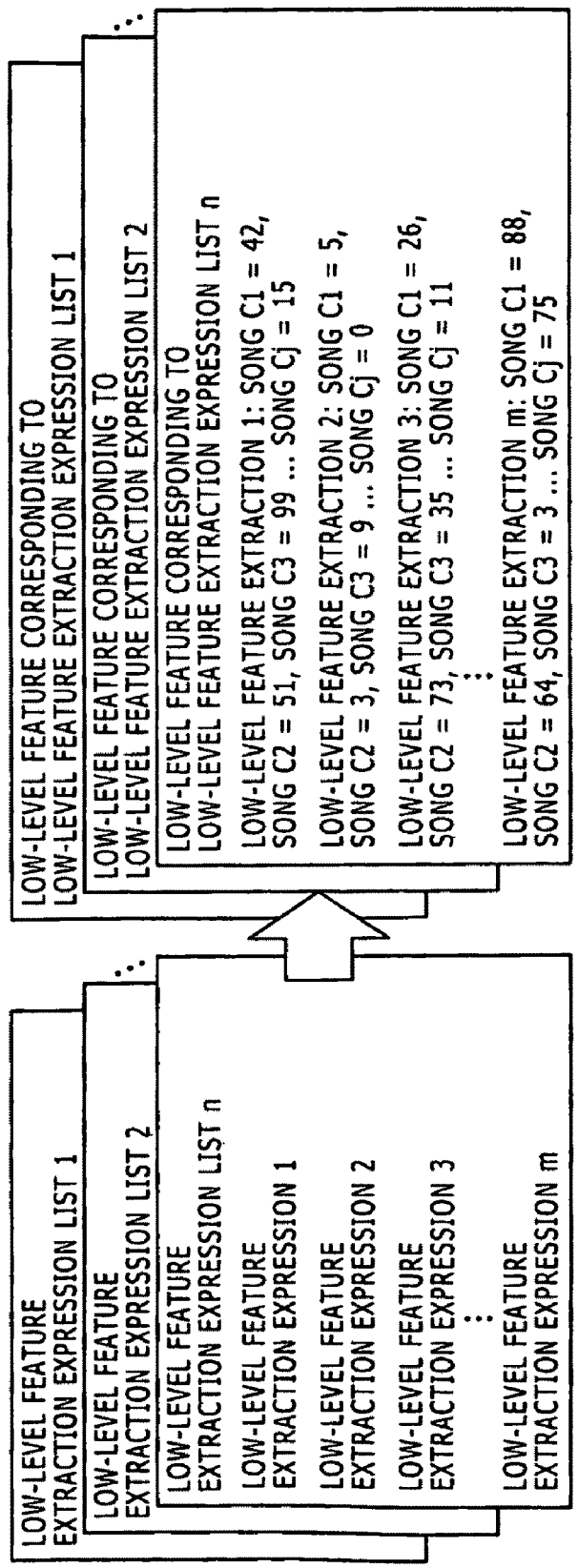
FIG. 22 is a schematic view explanatory of processing by a low-level feature computation section.

Illustratively, suppose that the low-level feature computation section 24 operates on the input data whose holding dimensions are the interval and temporal axes through computations involving the "#16Mean" operator, as shown in part A of FIG. 21. In this case, a mean value at each interval is computed on the temporal axis used as the process symmetry axis, as depicted in part B of FIG. 21. The computations result in V combinations of low-level feature extraction expressions (each combination is made up of "m" low-level features), each combination corresponding to each input data item, as indicated in FIG. 22. The resulting "n" low-level feature extraction expression combinations are output to the high-level feature extraction expression learning section 25.

Figure 23:
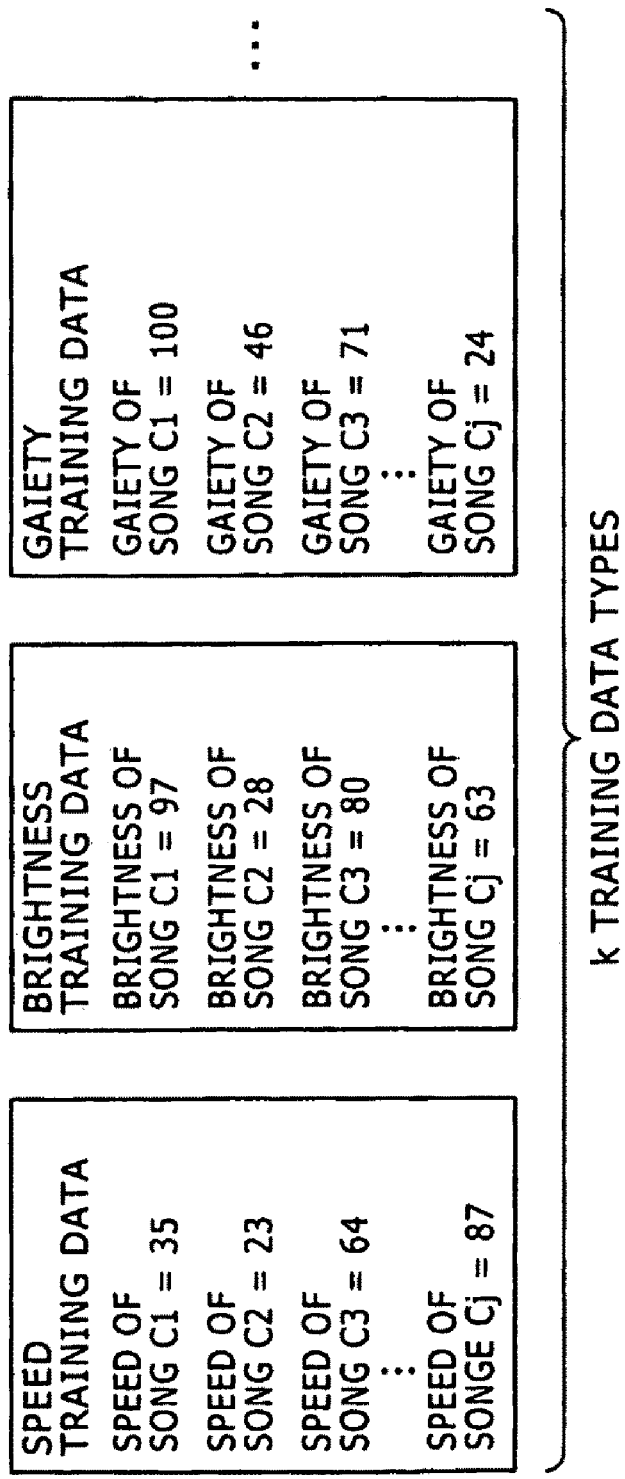
FIG. 23 is a schematic view explanatory of examples of training data.

In step S4 back in FIG. 7, the high-level feature extract ion expression learning section 25 estimates (i.e., creates) "n" high-level feature extraction expression combinations each composed of "k" high-level feature extraction expressions through learning based on the "n" low-level features input from the low-level feature computation section 24 and on corresponding training data (i.e., "k" types of high-level features corresponding to each input data item (about songs C1 through Cj) as shown in FIG. 23). The high-level feature extraction expression learning section 25 further computes the estimated accuracy level of each high-level feature extraction expression and the contribution ratio of each low-level feature in each high-level feature extraction expression, and outputs the results of the computations to the low-level feature extraction expression list creation, section 21.

The high-level feature extraction expression learning process of step S4 is described below in detail with reference to the flowchart of FIG. 24.

In step S71, the control section 27 starts the list loop by initializing the list loop parameter N to "1." The list loop is repeated as many times as a predetermined list count "n." In step S72, the control section 27 starts a training data loop by initializing a training data loop parameter K to "1." The training data loop is repeated as many times as a predetermined training data type count "k."

In step S73, the control section 27 starts an algorithm loop by initialising an algorithm loop parameter A to "1." The algorithm loop is repeated as many times as a predetermined learning algorithm type count "a."

Illustratively, there may be conceived four learning algorithm types: Regression (Regression analysis), Classify (Classification), SVM (Support Vector Machine), and GP (Genetic Programming).

Figure 25:
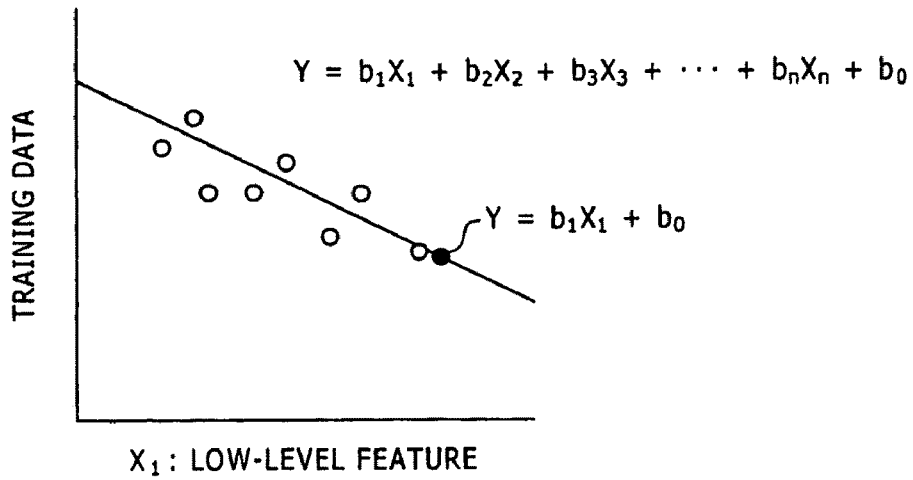
FIG. 25 is a graphic representation explanatory of a learning algorithm.
Figure 26:
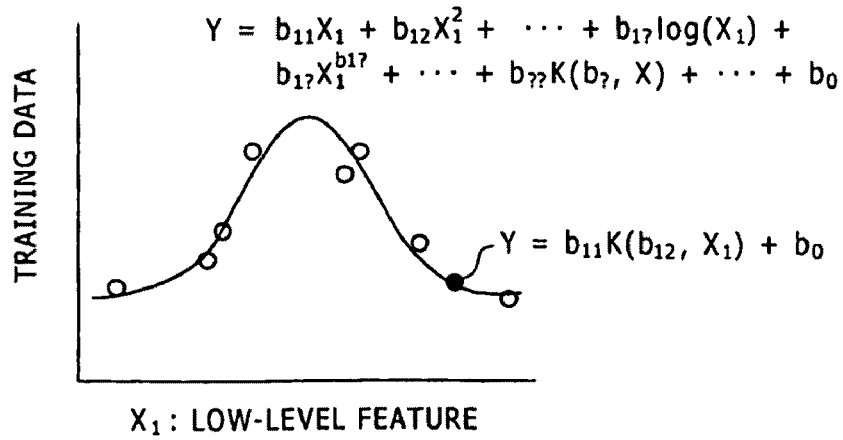
FIG. 26 is a graphic representation explanatory of another learning algorithm.

There may be provided two "Regression" type learning algorithms. One algorithm, as shown in FIG. 25, involves learning a parameter "$b_n$" in such a manner that the square error between training data and an item Y is minimised on the assumption that the training data is in linear relation to low-level features. Another algorithm, as shown in FIG. 26, involves learning a parameter "$b_{nm}$" in such a manner that the square error between training data and an item Y is minimised on the assumption that the training data is in nonlinear relation to low-level features.

There may be provided three major "Classify" type learning algorithms. One algorithm, as shown in FIG. 27, involves computing a Euclidian distance "d" of a given item from the center of each of different classes (a male vocal class and a female vocal class in the example of FIG. 27) and classifying the item into the class to which the computed Euclidian distance "d" is the shortest. Another algorithm, as shown in FIG. 28, involves computing a correlation coefficient "correl" of a given item relative to the mean vector of each of different classes (a male vocal class and a female vocal class in the example of FIG. 28) and classifying the item into the class relative to which the correlation coefficient "correl" is the largest. Another algorithm, as shown in FIG. 29, involves computing a Mahalanobis distance "d" of a given item from the center of each of different classes (a male vocal class and a female vocal class in the example of FIG. 29) and classifying the item into the class to which the computed Mahalanobis distance "d" is the shortest.

It is also possible to conceive two "Classify" type learning algorithm variations. One variation, shown in part A of FIG. 30, involves having the distribution of each of different, class groups (male and female vocal class groups in the example of FIG. 30) represented by a plurality of classes, computing the Euclidian distance "d" of a given item from the center of each of the different classes, and classifying the item into the class to which the computed Euclidian distance "d" is the shortest. Another variation, as shown in part B of FIG. 30, involves having the distribution of each of different class groups (male and female vocal class groups in the example of FIG. 30) represented by a plurality of classes, computing the Mahalanobis distance "d" of a given item from the center of each of the different classes, and classifying the item info the class to which the computed Mahalanobis distance "d" is the shortest.

There may be provided one "SVM" type learning algorithm. This algorithm, as shown in FIG. 31, involves having the boundary plane between classes (a male and a female vocal class in the example of FIG. 31) represented by support vectors, and learning the parameter "$b_{nm}$" in such a manner as to maximize the distance (margin) between a discontinuous plane separating the classes on the one hand and the vectors near the boundary plane on the other hand.

Figures 33A, 33B:
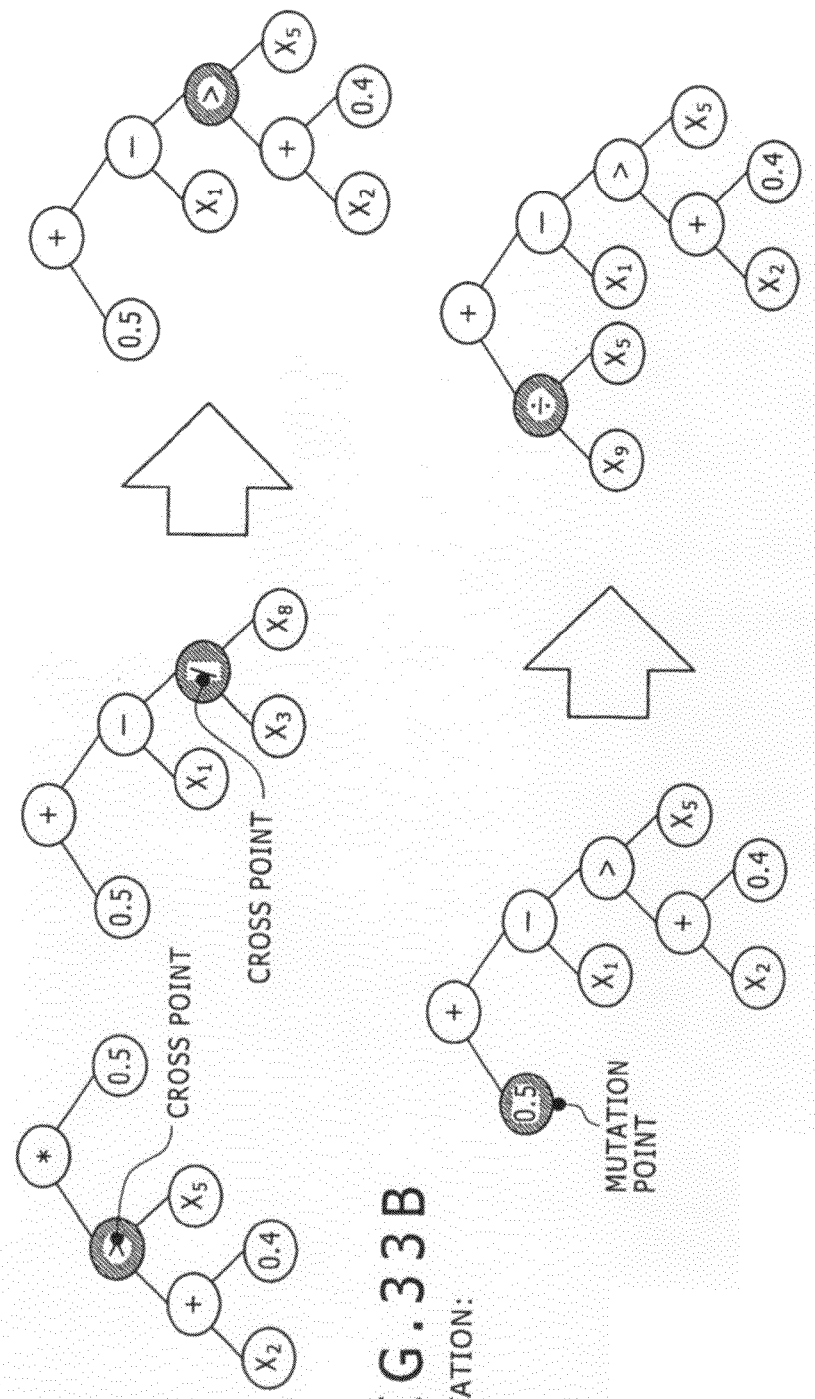
FIG. 33 is a graphic representation explanatory of another learning algorithm.

There may be provided three "GP" type learning algorithms. One algorithm, as shown in FIG. 32, involves creating an expression combining low-level features through genetic programming. Another algorithm, as depicted in part A of FIG. 33, involves crossing expressions each combining low-level features. Another algorithm, as indicated in part B of FIG. 33, involves mutating an expression combining low-level features.

If the above-outlined learning algorithms are all adopted, there will be 11 learning algorithms for use.

Figure 24:
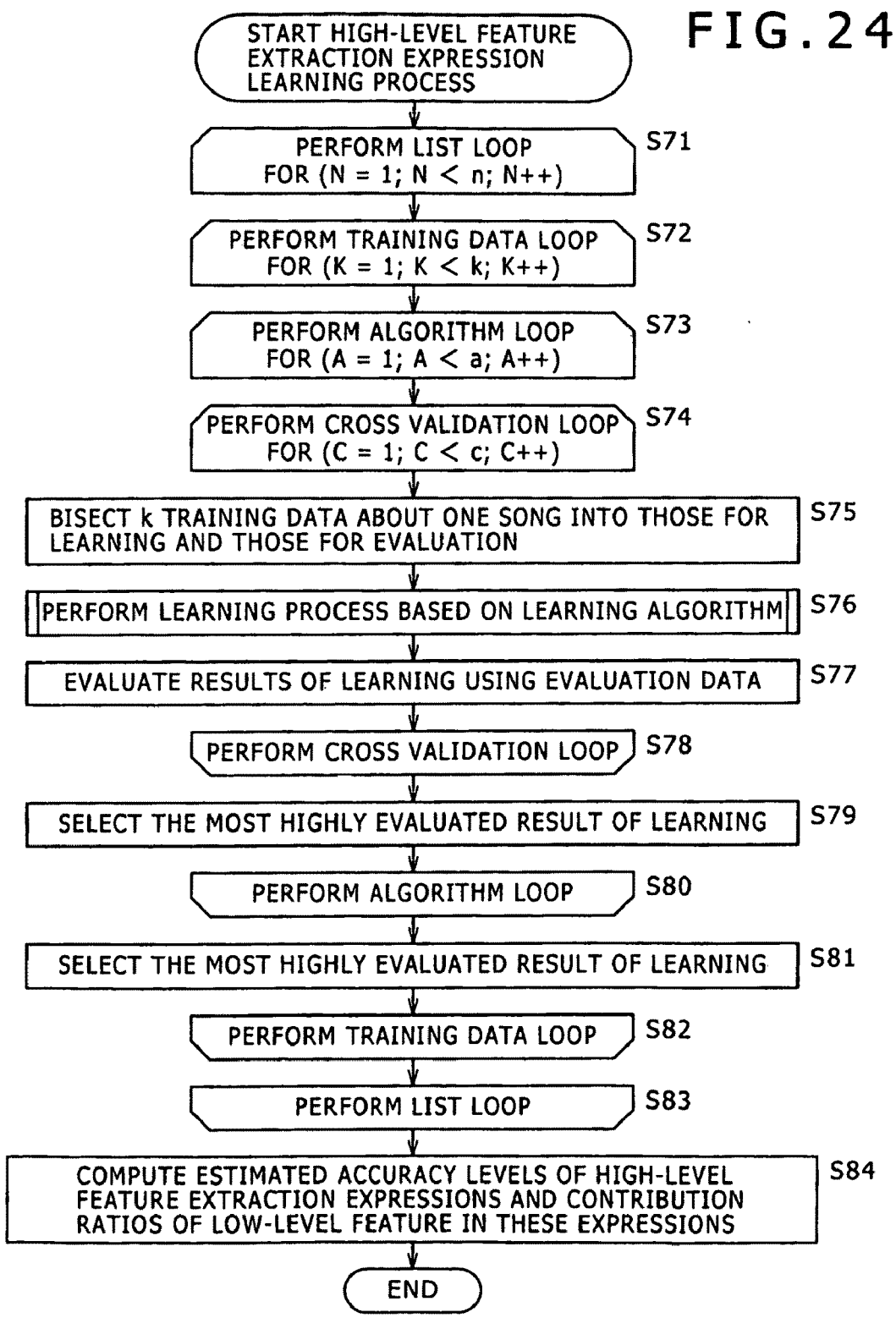
FIG. 24 is a flowchart of steps constituting a high-level feature extraction expression learning process performed by a high-level feature extraction expression learning section as part of the structure in FIG. 5.

In step S74 back in FIG. 24, the control section 27 starts a cross validation loop by initializing a cross validation loop parameter C to "1." The cross validation loop is repeated as many times as a predetermined cross validation count "c."

In step S75, the high-level feature extraction expression learning section 25 randomly bisects K-th type training data (true high-level features) about "j" songs out of as many as "k" training data types, into learning-use data and evaluation-use data. In the description that follows, the training data classified for learning use will be referred to as the learning data and the training data classified for evaluation use will be called the evaluation data.

In step S76, the high-level feature extraction expression learning section 25 estimates a high-level feature extraction expression through learning that involves the application to an a-th learning algorithm of corresponding learning data as well as the combination of "m" low-level features computed using the M-th low-level feature extraction expression list. During the learning, some of the "m" low-level features are genetically selected for use in order to reduce the amount of computations and to suppress over-learning (over-fitting).

As the criterion for selecting the low-level features, either an information quantity criterion called AIC (Akaike Information Criterion) that is a function or an information quantity criterion called BIC (Bayesian Information Criterion) is utilized. The AIC and BIC are each used as the criterion for selecting a learning model (regarding the selected low-level features in this case). The smaller the value of the learning model, the better the model (i.e., highly evaluated).

The AIC is defined by the following expression:

$AIC = 2 \times \text{maximum logarithmic likelihood} - 2 \times \text{free parameter count}$ If a "Regression (linear)" type learning algorithm, is adopted (as in the case of FIG. 25), then free parameter count=$n$+1 and logarithmic likelihood=$-0.5 \times$learning data count$\times$((log 2$\Pi$)+1+log(mean square error))

so that $AIC$=learning data count$\times$((log 2$\Pi$)+1+log(mean square error))+2$\times$($n$+1)

The RIC is defined by the following expression:

$BIC = -2 \times \text{maximum logarithmic likelihood} + \log(\text{learning data count}) \times \text{free parameter count}$ Illustratively, if a "Regression (linear)" type learning algorithm is adopted (as in the case of FIG. 25), then $BIC$=learning data count$\times$((log 2$\Pi$)−1+log(mean square error))+log(learning data count)$\times$($n$+1)

Compared with the AIC, the BIC is noted for a negligible increase in its value despite the growing number of learning data.

Figure 34:
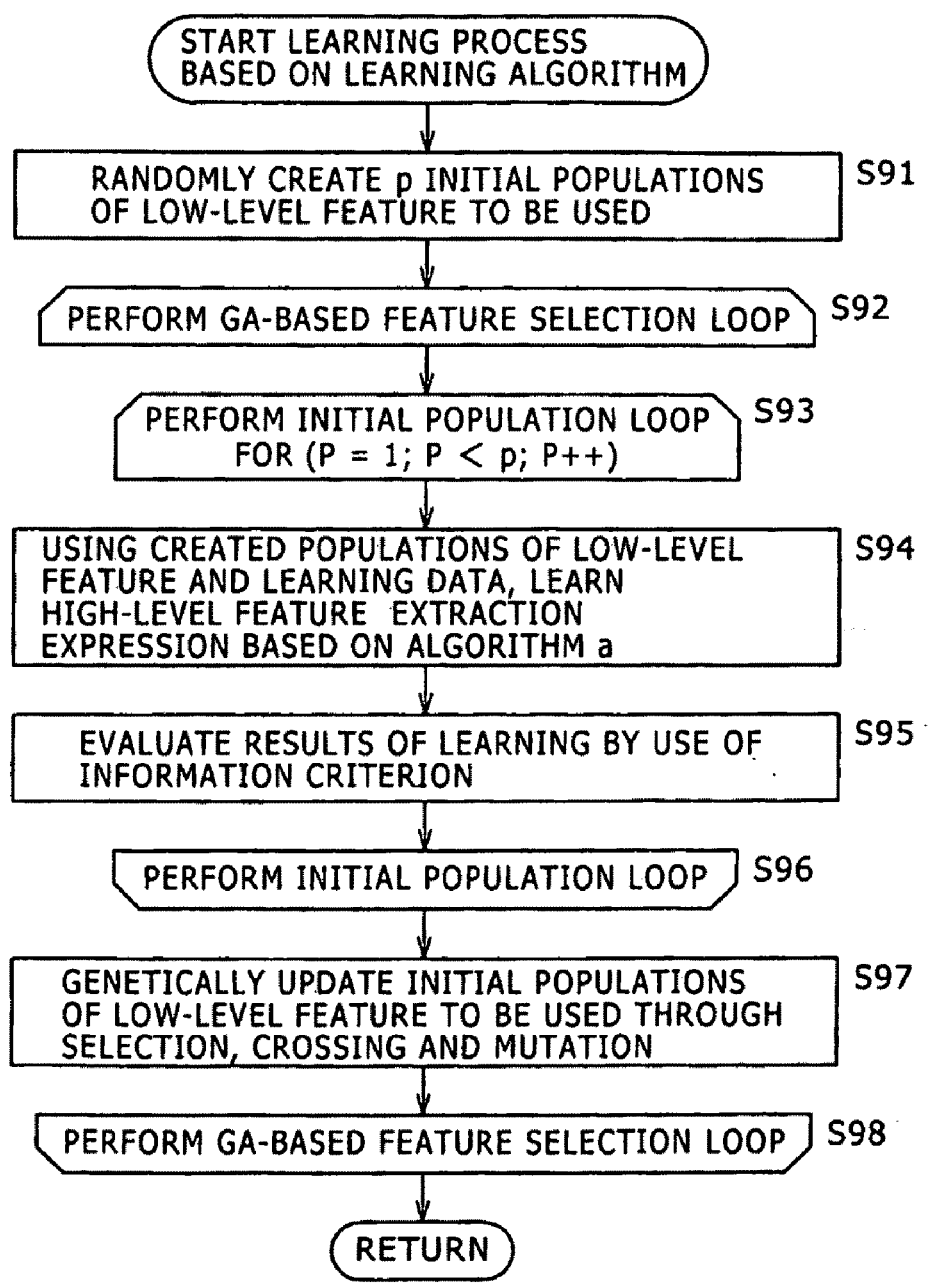
FIG. 34 is a flowchart of steps constituting a learning process based on a learning algorithm and performed by the high-level feature extraction expression learning section as part of the structure in FIG. 5.

The learning process based on a learning algorithm, in step S76 will now be described in reference to FIG. 34. For this learning process, as discussed above, some of the computed "m" low-level features are genetically selected for use in order to reduce the amount of computations and to suppress over-learning (over-fitting).

In step S91, the high-level feature extraction expression learning section 25 creates as many as "p" initial populations of low-level features through random selection from the "m" low-level features (for use in learning).

In step S92, the high-level feature extraction expression learning section 25 starts a feature selection loop using a genetic algorithm (GA). The GA-based feature selection loop is repeated until a particular condition is met in a subsequent step S98.

In step S93, the control section 27 starts an initial population loop by initializing an initial population loop parameter P to "1." The initial population loop is repeated as many times as the number "p" of initial, populations of low-level features created in step S91.

In step S94, the high-level feature extraction expression learning section 25 estimates a high-level feature extraction expression through learning that involves the application to an A-th learning algorithm of the low-level features included in the P-th initial population and corresponding learning data out of training data.

In step S95, the high-level feature extraction expression learning section 25 computes the information quantity criterion AIC or BIC as the evaluation value for the high-level feature obtained as a result of step S94.

In step S96, the control section 27 checks to determine whether the initial population parameter P is smaller than the maximum value "p." If the initial population parameter P is found to be smaller than the maximum value "p," then the initial population loop parameter P is incremented by "1" and step S94 is reached again. On the other hand, if the initial population parameter P is not found to be smaller than the maximum value "p" (i.e., if the parameter P is equal to the maximum value "p"), then the initial population loop is exited and step S97 is reached. The information quantity criterion AIC or BIC is thus acquired as the evaluation value for the high-level feat/ere extraction expression learned from each initial population in steps S93 through 396 constituting the initial population loop.

In step S97, the high-level feature extraction expression learning section 25 genetically updates "p" initial populations made up of low-level features to be used for learning. More specifically, as in steps S32 through S34 of FIG. 17, the initial populations are updated through selection, crossing, and mutation. The update is intended to improve the evaluation value for the high-level feature extraction expression, acquired from the initial populations created initially in random fashion.

In step S98, the control section 27 checks to determine whether the high-level feature extraction expression having the highest evaluation value (i.e., the smallest information quantity criterion) among the high-level feature extraction expressions corresponding to the "p" initial populations is found to have its evaluation value improved (i.e., information quantity criterion is lowered) following each GA-based feature selection loop. If the result of the check in step S98 is affirmative, then step S93 is reached again and the feature selection loop is repeated. On the other hand, it might happen that the high-level feature extraction expression having the highest evaluation value among the expressions corresponding to the "p" initial populations is not found to have its evaluation value improved (i.e., information quantity criterion is not reduced) following the repeated GA-based feature selection loop. In this case, the GA-based feature selection loop is exited, and the high-level feature extraction expression having the highest evaluation value is output to a downstream process (i.e., to step S77 in FIG. 24). This brings the learning process based on a learning algorithm to an end.

The number of low-level features selected in step S91 may be fixed. In this case, the necessary number of low-level features may be obtained using the entropy of relevant training data. Likewise, the training data may be analyzed for main components and the number of low-level features may be set equal to the number of the analyzed main components.

In step S77 back in FIG. 24, the high-level feature extraction expression learning section 25 evaluates the high-level feature extraction expression having the highest evaluation value acquired in step S76, using relevant evaluation data. More specifically, the high-level feature extraction expression learning section 25 computes the high-level feature using the acquired high-level feature extraction expression to find the square error between the result of the computation and the evaluation data in question.

In step S78, the control section 27 checks to determine whether the cross validation loop parameter C is smaller than the maximum value "c." If the cross validation loop parameter C is found to be smaller than the maximum value "c" then the parameter C is incremented by "1" and step S75 is reached again. On the other hand, if the cross validation loop parameter C is not found to be smaller than the maximum value "c" (i.e., if the parameter C is equal to the maximum value "c"), then the cross validation loop is exited and step S79 is reached. As many as "c" high-level feature extraction expressions are thus acquired as a result of the learning in steps S74 through S78 constituting the cross validation loop. Because the learning data and evaluation data are randomly transformed through the cross validation loop, it is possible to verify that the high-level feature extraction expressions are not over-learned.

In step S79, the high-level feature extraction expression learning section 25 selects the high-level feature extraction expression having the highest evaluation value derived from step S77 out of the "c" high-level feature extraction expressions acquired through the cross validation loop.

In step S80, the control section 27 checks to determine whether the algorithm loop parameter A is smaller than the maximum value "a." If the algorithm loop parameter A is found to be smaller than the maximum value "a," then the parameter A is incremented by "1" and step S74 is reached again. On the other hand, if the algorithm, loop parameter A is not found to be smaller than the maximum value "a" (i.e., if the parameter A is equal to the maximum value "a"), then the algorithm loop is exited and step S81 is reached. As many as "a" high-level feature extraction expressions of the K-th type learned using "a" learning algorithms are thus acquired in steps S73 through S80 constituting the algorithm loop.

In step S81, the high-level feature extraction expression learning section 25 selects the high-level feature extraction expression having the highest evaluation value derived from step S77 out of the "a" high-level feature extraction, expressions learned through the algorithm loop.

In step S82, the control section 27 checks to determine whether the training data loop parameter K is smaller than the maximum value "k." If the training Oars loop parameter K is found to be smaller than the maximum value "k," then the parameter K is incremented by "1" and step S73 is reached again. On the other hand, if the training data loop parameter K is not found to be smaller than the maximum value "k" (i.e., if the parameter K is equal to the maximum value "k"), then the training data loop is exited and step S33 is reached. As many as "k" high-level feature extraction expressions corresponding to the N-th low-level feature extraction expression list are thus acquired in steps S72 through S82 constituting the training data loop.

In step S83, the control section 27 checks to determine whether the list loop parameter N is smaller than the maximum, value "n." If the list loop parameter N is found to be smaller than the maximum value "n," then the parameter N is incremented by "1" and step S72 is reached again. On the other hand, if the list loop parameter N is not found to be smaller than the maximum value "n" (i.e., if the parameter N is equal to the maximum value "n"), then the list loop is exited and step S84 is reached. As many as "k" high-level feature extraction expressions corresponding to each of "n" low-level feature extraction expression lists are thus acquired in steps S71 through S83 constituting the list loop.

In step S84, the high-level feature extraction expression learning section 25 computes the estimated accuracy level of each of "k" high-level feature extraction expressions corresponding to each of the acquired "n" low-level feature extraction expression lists and the contribution ratio of each low-level feature in each high-level feature extraction expression, and outputs the results of the computations to the low-level feature extraction expression list creation section 21. This brings the high-level feature extraction expression learning process to an end.

In step S5 back in FIG. 7, the control section 27 checks to determine whether the learning loop parameter G is smaller than the maximum value "g." If the learning loop parameter G is found to be smaller than the maximum value "g," then the parameter G is incremented by "1" and step S2 is reached again. On the other hand, if the learning loop parameter G is not found to be smaller than the maximum value "g" (i.e., if the parameter G is equal to the maximum value "g"), then the learning loop is exited and step S6 is reached. Steps S1 through S5 constitute the feature extraction algorithm learning process. Step S6 following that process is a process for computing high-level features using feature extraction algorithms.

In step S6, the high-level feature extraction expression learning section 25 supplies the high-level feature computation section 26 with "m" low-level feature extraction expressions constituting the list having the highest mean accuracy level of the acquired high-level-features out of "n" low-level feature extraction expression lists of the latest generation obtained through learning, along with "k" high-level feature extraction expressions corresponding to that list.

In step S7, the high-level feature computation section 26 computes a high-level feature with high accuracy using the low-level feature extraction expressions and high-level feature extraction expressions supplied most recently from the high-level feature extraction expression learning section 25. The high-accuracy high-level feature computation process of step S7 will be discussed later in reference to FIG. 38 and subsequent drawings.

The foregoing paragraph completes the description of the feature extraction algorithm creation process performed by the feature extraction algorithm creation apparatus 20.

What follows is a description of a new operator creation process to be carried out as generations of low-level feature extraction expression lists progress following the repeated learning loop constituted by steps S1 through S6 in the above-described feature extraction algorithm creation process, such as when the contribution ratio of a low-level feature extraction expression has improved or when the estimated accuracy level of a corresponding high-level feature extraction expression has been boosted.

When the current, generation of low-level feature extraction expression lists is replaced by a new generation, permutations of a plurality of operators (hereinafter simply called operator combinations) may frequently appear in different low-level feature expressions as shown in FIG. 35. In that case, a combination of a plurality of operators appearing frequently in the different low-level feature expressions may be regarded as a single new operator and registered as such for use by the low-level feature extraction expression list creation section 21.

In the example of FIG. 35, a three-operator combination "32#FFT, Log, 32#FFT" is shown appearing in five low-level feature extraction expressions. If the operator combination "32#FET, Log, 32#FFT" is registered illustratively as one operator "NewOperator 1," then low-level feature extraction expressions of the next and subsequent generations will include the operator "NewOperator 1" as shown in FIG. 36.

Figure 37:
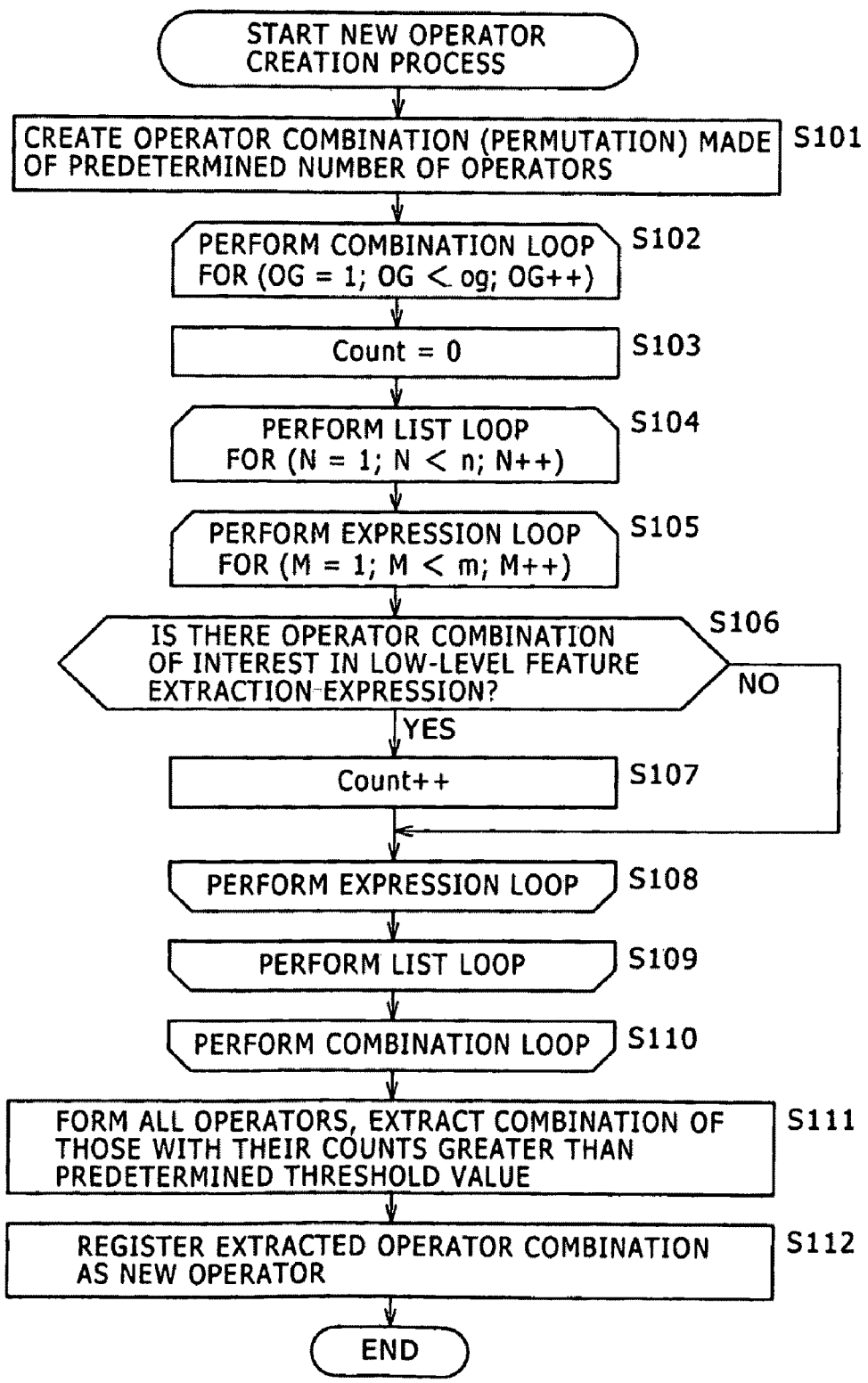
FIG. 37 is a flowchart of steps constituting a new operator creation process.

The new operator creation will is described below in reference to the flowchart of FIG. 37. In step S101, the operator combination detection section 22 creates a permutation (a sequenced combination) of a predetermined number of operators (e.g., 1 to 5 operators). The number of operator combinations to be created in this process is assumed to be "og."

In step S102, the control section 27 starts a combination loop by initialising a combination loop parameter OG to "1." The combination loop is repeated as many times as an operator combination count "og."

In step S103, an operator combination occurrence frequency "Count" of the og-th operator combination is initialized to "1." In step S104, the control section 27 starts the list loop by initializing the list loop parameter N to "0." The list loop is repeated as many times as the predetermined list count "n." In step S105, the control section 27 starts the expression loop by initializing the expression loop parameter M to "1." The expression loop is repeated as many times as the number "m" of low-level feature extraction expressions constituting a single low-level feature extraction expression list.

In step S106, the operator combination detection section 22 checks to determine whether the og-th operator combination exits in the M-th low-level feature extraction expression as part of the R-th low-level feature extraction expression list. If the og-th operator combination is found to exist in the expression, then step S107 is reached and the occurrence frequency "Count" is incremented by "1." On the other hand, if the og-th operator combination is not found to exist, then, step S107 is skipped and step S108 is reached.

In step S108, the control section 27 checks to determine whether the expression loop parameter M is smaller than the maximum value "m." If the expression loop parameter M is found to be smaller than the maximum value "m," then the parameter M is incremented by "1" and step S106 is reached again. On the other hand, if the expression loop parameter M is not fount to be smaller than the maximum value "m" (i.e., if the parameter M is equal to the maximum value "m"), then the expression loop is exited and step S109 is reached.

In step S109, the control section 27 checks to determine whether the list loop parameter R is smaller than the maximum value "n." If the list loop parameter N is found to be smaller than the maximum value "n," then the list loop parameter N is incremented by "1" and step S105 is reached again. On the other hand, if the list loop parameter N is not found to be smaller than the maximum value "n" (i.e., if the parameter N is equal to the maximum value "n"), then the list loop is exited and step S110 is reached.

In step S110, the control section 27 checks to determine whether the combination loop parameter OG is smaller than the maximum value "og." If the combination loop parameter OG is found to be smaller than the maximum value "og," then the parameter OG is incremented by "1" and step S103 is reached again. On the other hand, if the combination loop parameter OG is not found to be smaller than the maximum value "og" (i.e., if the parameter OG is equal to the maximum value "og"), then the combination loop is exited and step S110 is reached. The occurrence frequency "Count" of each of all operator combinations is thus detected by the processing up to this point.

In step S111, the operator combination detection section 22 extracts the operator combination of which the occurrence frequency "Count" is higher than a predetermined threshold value, and outputs the extracted combination to the operator creation section 23. In step S112, the operator creation section 23 registers the operator combination input from the operator combination detection section 22 as a new operator. This brings the new operator creation process to an end.

According to the new operator creation process, as described above, the combination of frequently occurring operators, i.e., the combination of operators considered effective in computing high-level features is registered as a single operator for use in low-level feature extraction expressions of the next and subsequent generations. This boosts the speed at which to create low-level feature extraction expressions as well as the speed of progress of expression generations. It is thus possible to detect effective low-level feature extraction expressions at early stages. Another benefit of the new operator creation process is automatic detection of the effective operator combinations that used to be detected manually.

Figure 38:
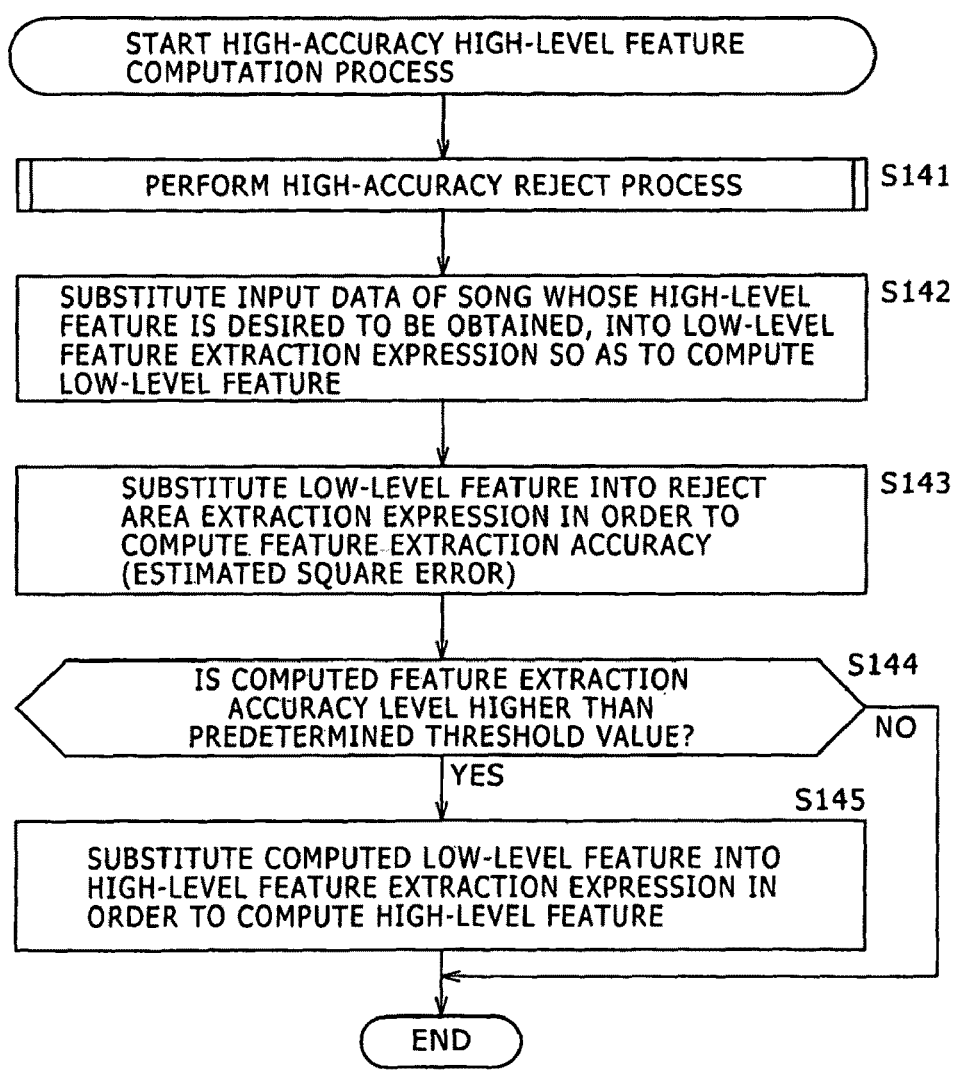
FIG. 38 is a flowchart of steps constituting a high-accuracy high-level feature computation process.

The above-outlined high-accuracy high-level feature computation process in step S7 of FIG. 7 is described below in more detail with reference to the flowchart of FIG. 38.

In step S141, the high-level feature computation section 26 performs a high-accuracy reject process for selecting only the high-level feature extraction expressions yielding high-accuracy results out of those expressions eventually supplied from the high-level feature extraction expression learning section 25.

Figure 39:
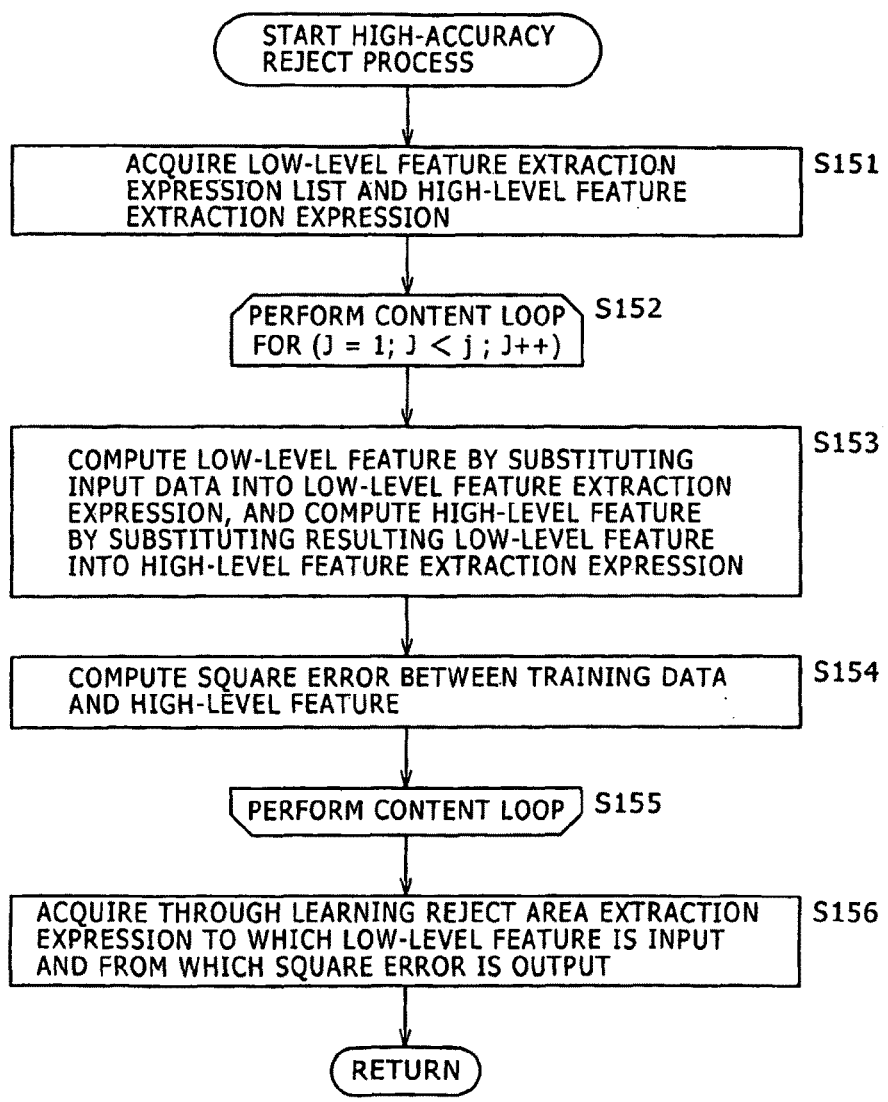
FIG. 39 is a flowchart of steps constituting a high-accuracy reject process.

The high-accuracy reject process is based on the assumption that there is a causal relationship between the accuracy levels of high-level features on the one hand and the values of low-level features on the other hand. On that premise, the process involves acquiring through learning a reject area extraction expression to which low-level features are input and from which the accuracy level of a high-level feature is output. The high-accuracy reject process is described below in detail with reference to the flowchart of FIG. 39.

In step S151, the low-level feature computation section 41 in the high-level feature computation section 26 acquires an eventual low-level feature extraction expression list. The high-level feature computation section 42 in the high-level feature computation section 26 obtains an eventual high-level feature extraction expression.

In step S152, the control section 27 starts a content loop by initializing a content loop parameter J to "1." The content loop is repeated as many times as the number "j" of input data items (content data and metadata) that may be provided beforehand for carrying out the high-accuracy reject process. It is assumed that the high-level features corresponding to the prepared input data are also provided as training data.

In step S153, the low-level feature computation section 41 substitutes the L-th input data item into the eventual low-level feature extraction expression list acquired in step S151, and outputs "m" low-level features resulting from the computations to the high-level feature computation section 42 and to the reject area extraction expression learning section 44. The high-level feature computation section 42 substitutes the "m" low-level features input from the low-level feature computation section 41 into the eventual high-level feature extraction expression acquired in step S151, and outputs the high-level feature resulting from the computations to the square error computation section 43.

In step S154, the square error computation section 43 computes a square error between the high-level feature input from the high-level feature computation section 42 and the training data (i.e., true high-level feature corresponding to the input data), and outputs the result of the computation to the reject area extraction expression learning section 44. The square error thus computed represents the accuracy of the high-level feature extraction expression computed by the high-level feature computation section 42 (the computed accuracy is called the feature extraction accuracy).

In step S155, the control section 27 checks to determine whether the content loop parameter J is smaller than the maximum value "j." If the content loop parameter J is found to foe smaller than the maximum value "j," then the parameter J is incremented by "1" and step S153 is reached again. On the other hand, if the content parameter J is not found to be smaller than the maximum value "j" (i.e., if the parameter J is equal, to the maximum value "j"), then the content loop is exited and step S156 is reached. The square error between the computed high-level feature and the training data corresponding to each input data item is thus acquired in steps S151 through S155 constituting the content loop.

In step S156, the reject area extraction expression learning section 44 creates a reject area extraction expression to which the low-level features are input and from which the feature extraction accuracy of the high-level feature computed using the input quantities is output, through learning based on the low-level features input from the low-level feature computation section 41 and on the square error input from the square error computation section 43. The reject area extraction expression thus created is supplied to the feature extraction accuracy computation section 45. This completes the high-accuracy reject process, and control is passed on to step S142 in FIG. 38.

In step S142, the low-level feature computation section 41 substitutes the input data of the song of which the high-level feature is desired to be acquired, into the eventual low-level feature extraction expression list so as to obtain the low-level features. The low-level feature computation section 41 outputs the results of the computations to the high-level feature computation section 42 and to the feature extraction accuracy computation section 45.

In step S143, the feature extraction accuracy computation section 45 substitutes the low-level features input from the low-level feature computation section 41 into the reject area extraction expression supplied from the reject area extraction expression learning section 44, so as to compute the feature extraction accuracy of the high-level feature computed using the input low-level features (i.e., square error estimated in regard to the high-level feature computed by the high-level feature computation section 42).

In step S144, the feature extraction accuracy computation section 45 cheers to determine whether the feature extraction accuracy computed in step S143 is higher than a predetermined threshold value. If the computed feature extraction accuracy is found to be higher than the threshold value, then step S145 is reached. In step S145, the feature extraction accuracy computation section 45 causes the high-level feature computation section 42 to compute the high-level feature. The high-level feature computation section 42 substitutes the "m" low-level features input from the low-level feature computation section 41 in step S142 into the eventual high-level feature extraction expression so as to compute the high-level feature. The high-level feature computed at this point is the eventual output. This completes the high-accuracy high-level feature computation process.

If in step S144 the computed feature extraction accuracy is found to be lower than the predetermined threshold value, then step S145 is skipped and the high-accuracy high-level feature computation process is brought to an end.

The high-accuracy high-level feature computation process described above makes it possible to estimate the accuracy of the high-level feature using the high-level feature extraction expression. Because those high-level features that are not expected to achieve high accuracy levels are excluded from computations, wasteful computations are eliminated.

As described, the feature extraction algorithm learning process performed by the feature extraction algorithm creation apparatus 20 practiced as the first embodiment of the present invention permits quick and highly accurate creation of algorithms for extracting relevant features from song data. The learning process also makes it possible to acquire only the high-level features of high accuracy levels with a minimum of computations.

Figure 40:
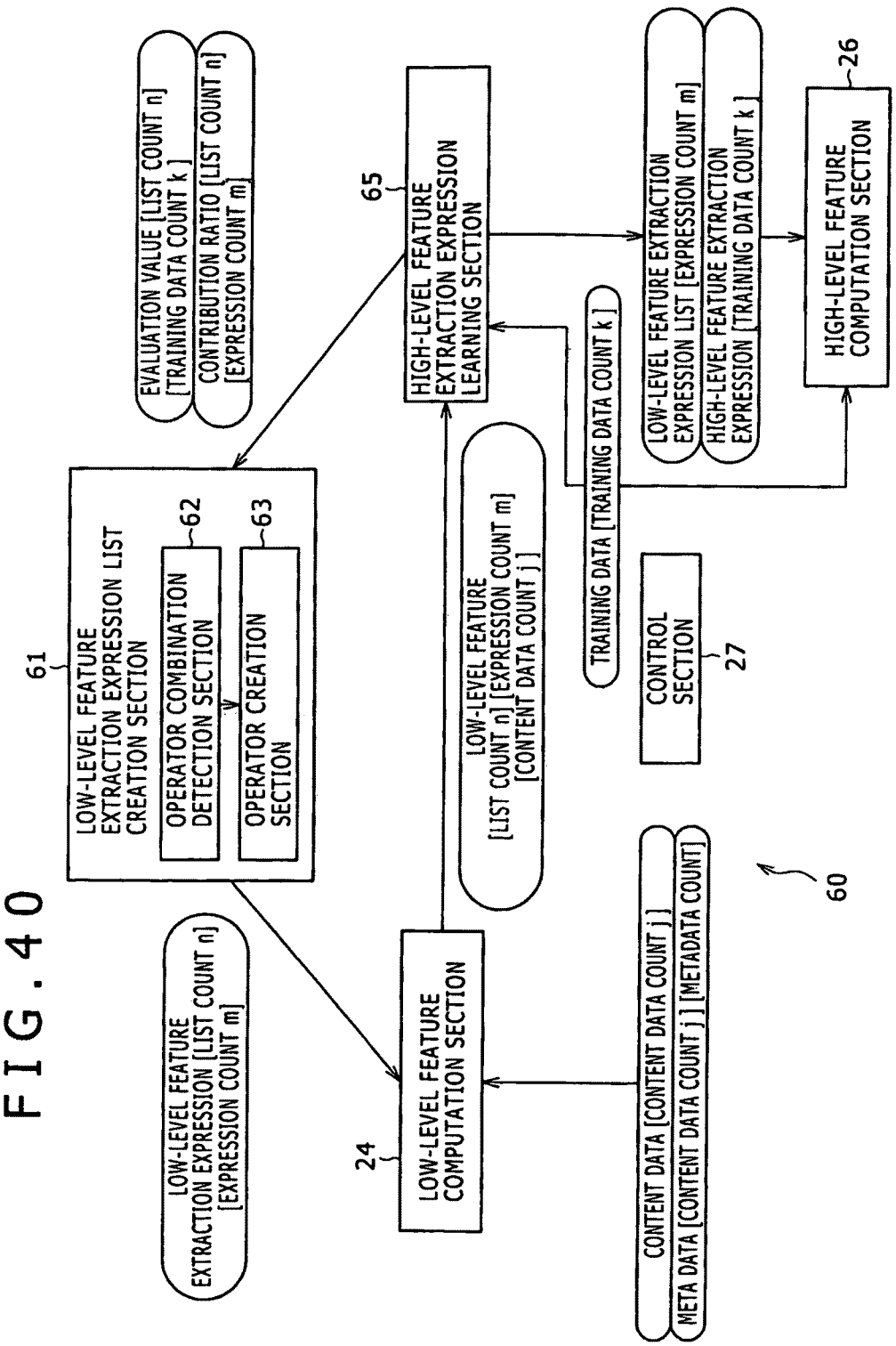
FIG. 40 is a block, diagram showing a second structural example of the feature extraction algorithm creation apparatus according to the present invention.

Described below are the workings of the feature extraction algorithm creation apparatus 60 practiced as a second embodiment of the present invention. FIG. 40 is a block diagram showing a typical structure of the feature extraction algorithm creation apparatus 60.

The feature extraction algorithm creation apparatus 60 replaces the low-level feature extraction expression list creation section 21 and high-level feature extraction expression learning section 25 in the feature extraction algorithm creation apparatus 20 with a low-level feature extraction expression list creation section 61 and a high-level feature extraction expression learning section 65 respectively.

There are some differences between the feature extraction algorithm creation apparatus 60 and the feature extraction algorithm creation apparatus 20. One difference is that whereas the number "m" of expressions in the low-level feature extraction expression list created by the low-level feature extraction expression list creation section 21 of the feature extraction algorithm creation apparatus 20 is a constant, the number "m" of expressions in each low-level feature extraction expression list created by the low-level feature extraction expression list creation section 61 of the feature extraction algorithm creation apparatus 60 is randomly determined.

Another difference is that while the high-level feature extraction expression learning section 25 of the feature extraction algorithm creation apparatus 20 outputs estimated accuracy levels and contribution ratios as a feedback to the low-level feature extraction expression list creation section 21, the high-level feature extraction expression learning section 65 of the feature extraction algorithm creation apparatus 60 outputs evaluation values and contribution ratios as a feedback to the low-level feature extraction expression list creation section 61.

The components of the feature extraction algorithm creation apparatus 60 other than the low-level feature extraction expression list creation section 61 and high-level feature extraction expression learning section 65 have substantially similar counterparts in the feature extraction algorithm creation apparatus 20. The similar components are designated by like reference numerals and will not be described further.

The workings of the feature extraction algorithm creation apparatus 60 will now be described by again referring to some of the drawings used earlier to explain the feature extraction algorithm creation apparatus 20 above.

The feature extraction algorithm creation process, a basic operation of the feature extraction algorithm creation apparatus 60, is described below in reference to the flowchart of FIG. 7.

In step S1, the control section 27 starts the learning loop by initializing the learning loop parameter G to "1." The learning loop is repeated as many times as the learning count "g" determined beforehand illustratively by the user.

In step S2, the low-level feature extraction expression list creation section 61 creates "n" low-level feature extraction expression lists and outputs the created lists to the low-level feature computation section 24.

The process of step S2 (low-level feature extraction expression list creation process) is described below in detail by referring to the flowchart of FIG. 9.

In step S11, the low-level feature extraction expression list creation section 61 checks to determine whether the low-level feature extraction expression lists to be crated are of the first generation. If the learning loop parameter G is set to "0," then the low-level feature extraction expression lists to be crated are found to be of the first generation.

When the low-level feature extraction expression lists to be crated are found to be of the first generation because the learning loop parameter G is set to "0," step S12 is reached. In step S12, the low-level feature extraction expression list creation section 61 randomly creates low-level feature extraction expression lists of the first generation.

By contrast, if the low-level feature extraction expression lists to be crated are not found to be of the first generation, then step S13 is reached. In step S13, the low-level feature extraction expression list creation section 61 genetically creates low-level feature extraction expression lists of the next generation using a genetic algorithm based on the low-level feature extraction expression lists of the latest generation.

Figure 41:
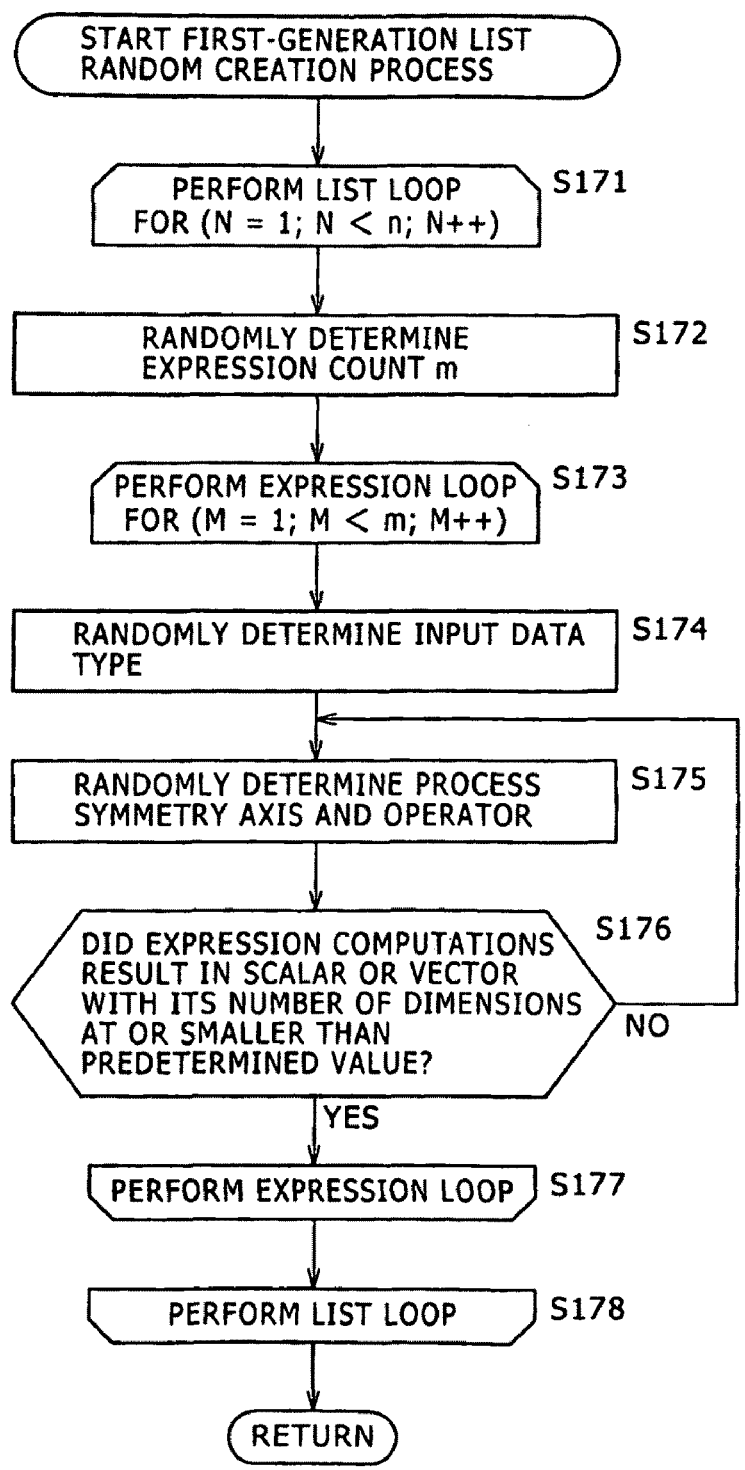
FIG. 41 is a flowchart of steps constituting a first-generation list random creation process performed by a low-level feature extraction expression list creation section as part of the structure in FIG. 40.

The first-generation list random creation process in step S12 performed by the low-level feature extraction expression list creation section 61 is described below in detail with reference to the flowchart, of FIG. 41.

In step S171, the control section 27 starts the list loop by initialising the list loop parameter N to "1." The list loop is repeated as many times as the predetermined list count "n."

In step S172, the low-level feature extraction expression list creation section 61 randomly determines the number "m" of low-level feature extraction expressions constituting the N-th low-level feature extraction expression list to be created for the first generation.

In step S173, the control section 27 starts the expression loop by initializing the expression loop parameter M to "1." The expression loop is repeated as many times as the number "m" of low-level feature extraction expressions constituting a single low-level feature extraction expression list.

In step S174, the low-level feature extraction expression list creation section 61 randomly determines the input data for the M-th low-level feature extraction expression (also referred to as the low-level feature extraction expression M) in the N-th low-level feature extraction expression list (also called the list N) to be created.

In step S175, the low-level feature extraction expression list creation section 61 randomly determines a process symmetry axis and a parameter for the low-level feature extraction expression M in the list N to be created.

In step S176, the low-level feature extraction expression list creation section 61 checks to determine whether the result of the computation by the low-level feature extraction expression M in the list N created up to that point in time is either a scalar (one-dimensional) or at most a predetermined number of dimensions (e.g., small number such as 1 or 2). If the result of the check in step S176 is negative, then step S175 is reached again and one more operator is added. With steps S175 and S176 repeated, the number of holding dimensions in the computed result decreases as shown in FIG. 16. If in step S176 the result of the computation by the low-level feature extraction expression M in the list N is either a scalar or at most a predetermined small number of dimensions (e.g., 1 or 2), then step S177 is reached.

In step S177, the control section 27 checks to determine whether the expression loop parameter M is smaller than the maximum value "m." If the expression loop parameter M is found to be smaller than the maximum value "m," then the parameter M is incremented by "1" and step S174 is reached again. Conversely, if the expression loop parameter M is not found to be smaller than the maximum value "m" (i.e., if the parameter M is equal to the maximum value "m"), then the expression loop is exited and step S178 is reached. The N-th low-level feature extraction expression lists of the first generation is thus created in steps S173 through S177 above.

In step S178, the control section 27 checks to determine whether the list loop parameter N is smaller than the maximum value "n." If the list loop parameter N is found to be smaller than the maximum value "n," then the parameter N is incremented by "1" and step S172 is reached again. On the other hand, if the list loop parameter N is not found to be smaller than the maximum value "n" (i.e., if the parameter N is equal to the maximum value "n"), then the list loop is exited and the first-generation list random creation process is terminated. As many as "n" low-level feature extraction expression lists of the first generation, each list having a different number "m" of expressions, are thus created by the processing up to this point.

Described below in detail with reference to the flowchart of FIG. 17 is the process performed by the low-level feature extraction expression list creation section 61 for creating low-level feature extraction expression lists of the second and subsequent generations (i.e., next-generation list genetic creation process) in step S13 of FIG. 5.

In step S31, the low-level feature extraction expression list creation section 61 randomly determines three numbers: a selection count "ns" representing the number of lists to which genetic algorithm selection is applied out of the "n" low level feature extraction expression lists to be created; a cross count "nx" denoting the number of lists to which genetic algorithm crossing is applied; and a mutation count "nm" indicating the number of lists to which genetic algorithm mutation is applied. The total sum of the selection count "ns," cross count "nx," and mutation count "nm" is equal to "n." Alternatively, the selection count "ns," cross count "nx," and mutation count "nm" may each foe a predetermined constant.

In step S32, the low-level feature extraction expression list creation section 61 creates as many as "ns" low-level feature extraction expression lists using the low-level feature extraction expression lists amounting to the selection count "ns" determined out of the "n" low-level feature extraction expression lists of the latest, generation. In step S33, the low-level feature extraction expression list creation section 61 creates as many as "nx" low-level feature extraction expression lists using the low-level feature extraction expression lists amounting to the cross count "nx" determined out of the "n" low-level feature extraction expression lists of the latest generation. In step S34, the low-level feature extraction expression list creation section 61 creates as many as "nm" low-level feature extraction expression lists using the low-level feature extraction expression lists amounting to the mutation count "nm" determined out of the "n" low-level feature extraction expression lists of the latest generation.

The process in each of steps S32 through S34 is described below in detail.

Figure 42:
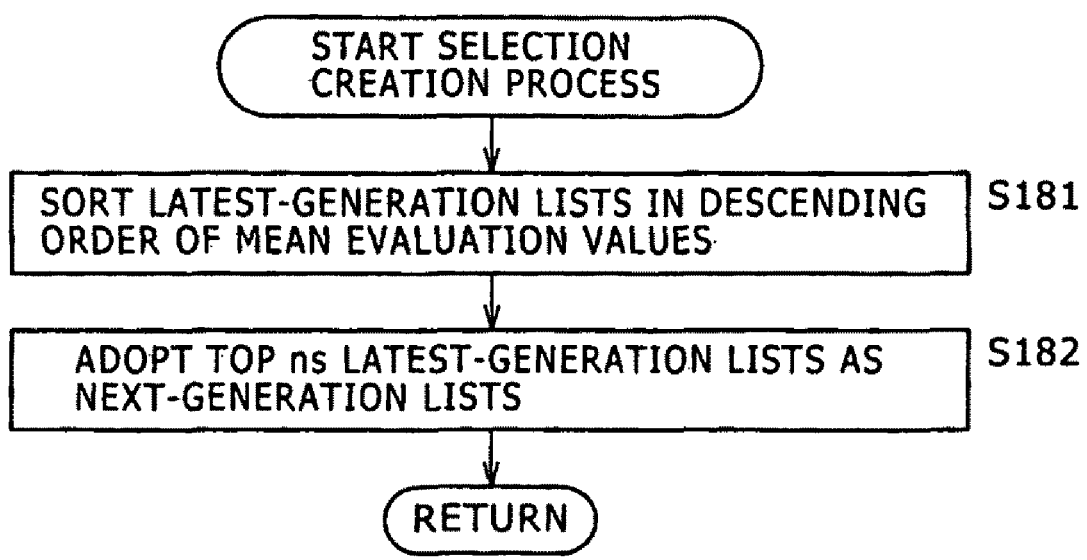
FIG. 42 is a flowchart of steps constituting a selection creation process performed by the low-level feature extraction expression list creation section as part of the structure in FIG. 40.

The selection creation process of step S32 performed by the low-level feature extraction expression list creation section 61 will now be described in detail with reference to the flowchart of FIG. 42. This selection creation process creates the low-level feature extraction expression lists amounting to the selection count "ns" out of the "n" low-level feature extraction expression lists of the next generation.

In step S181, the low-level feature extraction expression list creation section 61 sorts the "n" low-level feature extraction expression lists of the latest generation in descending order of the mean evaluation values of the high-level feature extraction expressions input from the high-level feature extraction expression learning section 65. In step S182, the low-level feature extraction expression list creation section 61 adopts the top "ns" low-level feature extraction expression lists from the sorted "n" low-level feature extraction expression lists of the latest generation as the low-level feature extraction expression lists of the next generation. This brings the selection creation process to an end.

Figure 43:
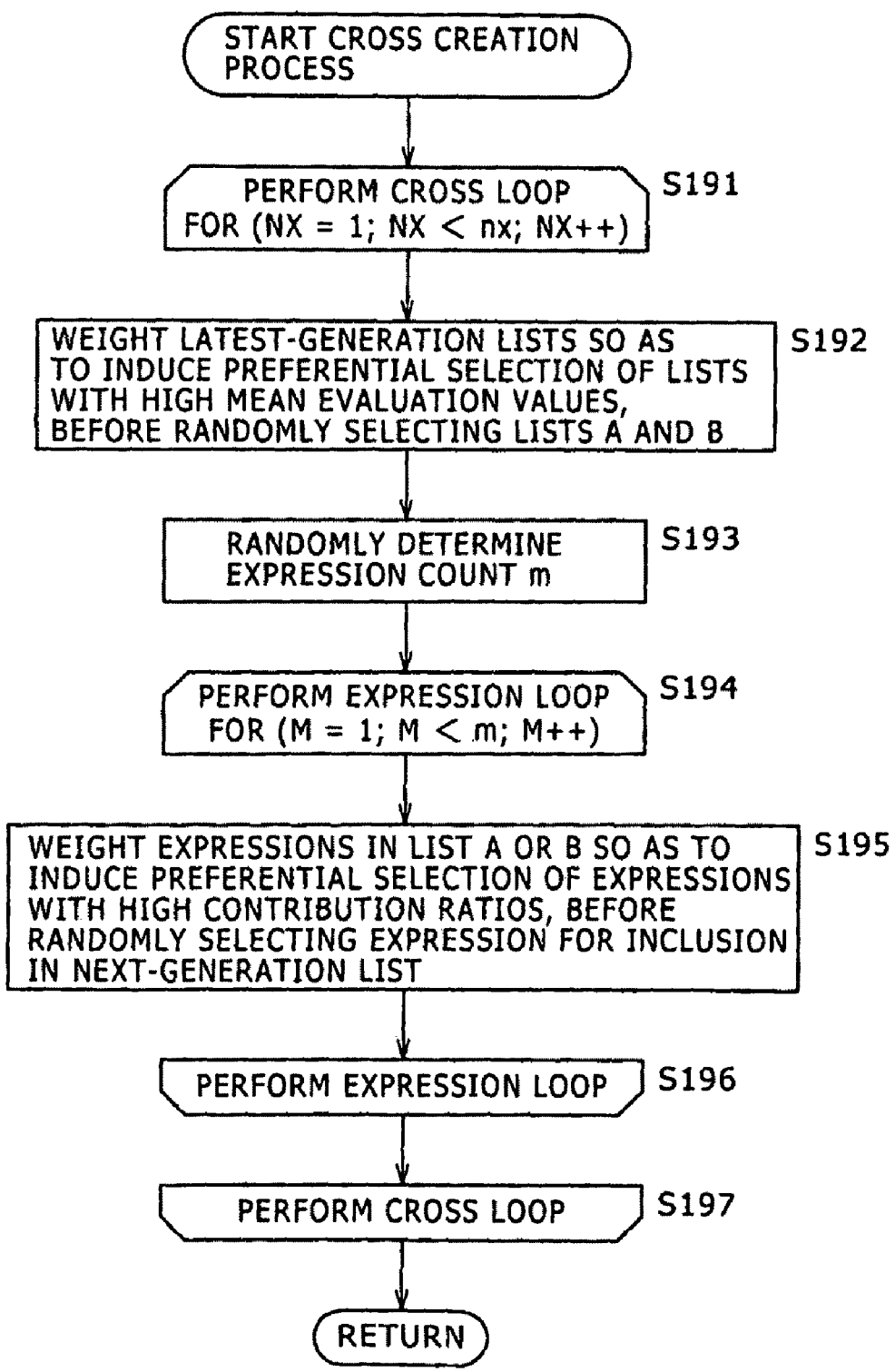
FIG. 43 is a flowchart of steps constituting a cross creation process performed by the low-level feature extraction expression list creation section as part of the structure in FIG. 40.

The cross creation process of step S33 in FIG. 17 performed by the low-level feature extraction expression list creation section 61 will now be described in detail with reference to the flowchart of FIG. 43. This cross creation process creates the low-level feature extraction expression lists amounting to the cross count "nx" out of the "n" low-level feature extraction expression lists of the next, generation.

In step S191, the control section 27 starts the cross loop by initializing the cross loop parameter NX to "1." The cross loop is repeated as many times as the cross count "nx."

In step S192, the low-level feature extraction expression list creation section 61 weights the low-level feature extraction expression lists of the latest generation so as to induce preferential section of the lists in descending order of the mean evaluation values of the high-level feature extraction expressions output by the high-level feature extraction expression learning section 65, before randomly selecting two low-level feature extraction expression lists A and B. During the selection of this process, the "ns" low-level feature extraction expression lists selected by the above-described selection creation process may be either excluded from the candidate lists or may be left intact as part of the candidate lists.

In step S193, the low-level feature extraction expression list creation section 61 randomly determines the number "m" of expressions in each low-level feature extraction expression list to be created through a subsequent expression loop, within the range defined as follows:

$$m=((\text{number of expressions in list } A+\text{number of expressions in list } B)/2)\pm mr$$

where, "mr" is a predetermined value.

In step S194, the control section 27 starts the expression loop by initializing the expression loop parameter M to "1." The expression loop is repeated as many times as the expression count "m" randomly determined in step S193.

In step S195, the low-level feature extraction expression list creation section 61 weights all low-level feature extraction expressions in the low-level feature extraction expression lists A and E so as to induce preferential section of the expressions in descending order of the contribution ratios of the high-level feature extraction expressions output by the high-level feature extraction expression learning section 65, before randomly selecting a single low-level feature extraction expression for inclusion in a low-level feature extraction expression list of the next generation.

In step S196, the control section 27 checks to determine whether the expression loop parameter M is smaller than the maximum value "m." If the expression loop parameter M is found to be smaller than the maximum value "m," then the parameter M is incremented by "1" and step S195 is reached again. Conversely, if the expression loop parameter M is not found to be smaller than the maximum value "m" (i.e., if the parameter M is equal to the maximum value "m"), then the expression loop is exited and step S197 is reached. A single low-level feature extraction expression list is thus created in steps S194 through S196 constituting the expression loop.

In step S197, the control section 27 checks to determine whether the cross loop parameter NX is smaller than the maximum value "nx." If the cross loop parameter NX is found to be smaller than the maximum value "nx," then the parameter NX is incremented by "1" and step S192 is reached again. On the other hand, if the cross loop parameter NX is not found to be smaller than the maximum value "nx" (i.e., if the parameter NX is equal to the maximum value "nx"), then the cross loop is exited and the cross creation process is terminated. The low-level feature extraction expression lists amounting to the cross count "nx" are thus created by the cross loop that has been executed.

Figure 44:
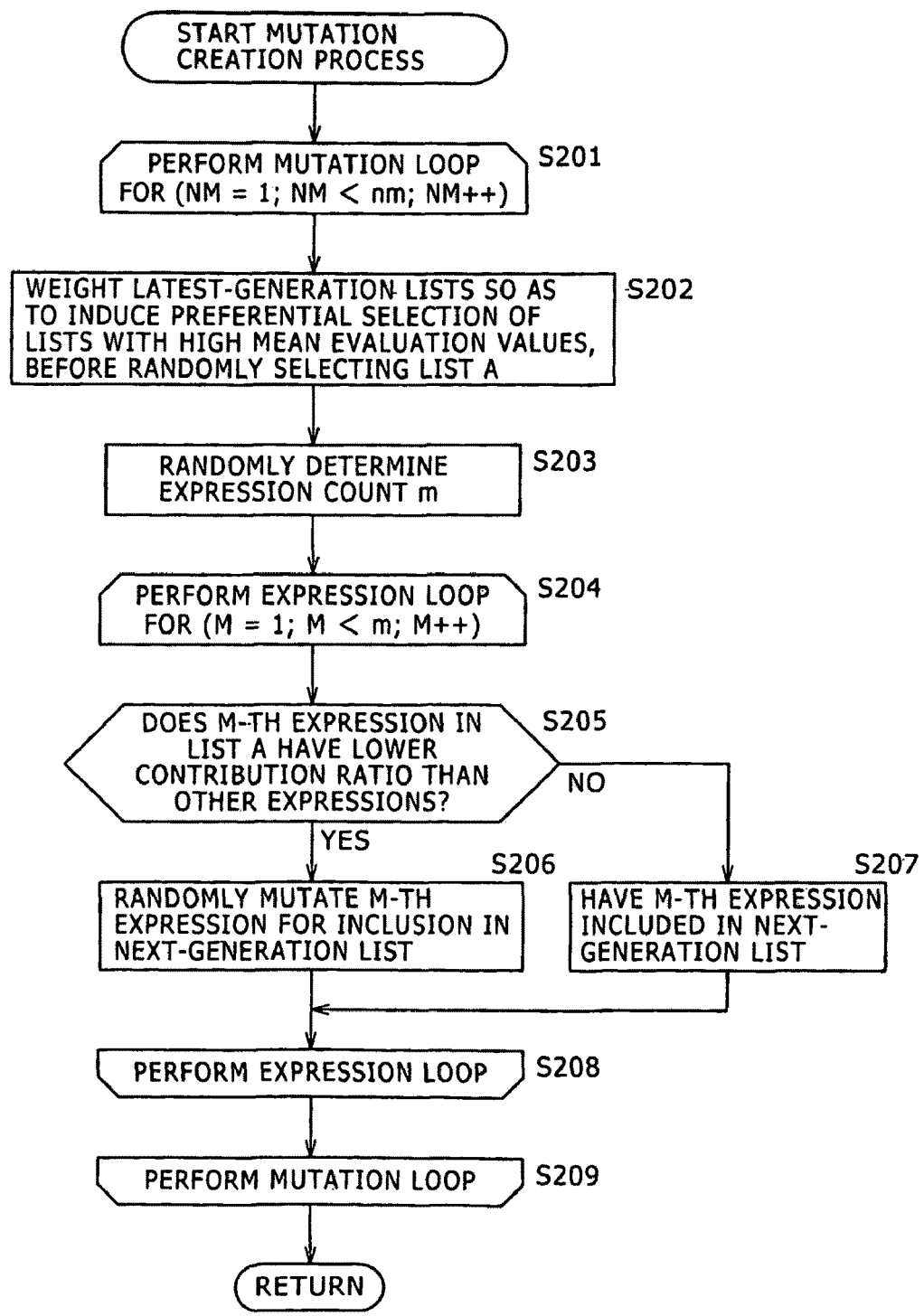
FIG. 44 is a flowchart of steps constituting a mutation creation process performed by the low-level feature extraction expression list creation section as part of the structure in FIG. 40.

The mutation creation process of step S34 in FIG. 17 performed by the low-level feature extraction expression list creation section 61 will now be described in detail with reference to the flowchart of FIG. 44. This mutation creation process creates the low-level feature extraction expression lists amounting to the mutation count "nm" out of the "n" low-level feature extraction expression lists of the next generation.

In step S201, the control section 27 starts the mutation loop by initializing the mutation loop parameter NM to "1." The mutation loop is repeated as many times as the mutation count "nm."

In step S202, the low-level feature extraction expression list creation section 61 weights the low-level feature extraction expression lists of the latest generation so as to induce preferential section of the lists in descending order of the mean evaluation values of the high-level feature extraction expressions output by the high-level feature extraction expression learning section 65, before randomly selecting a single low-level feature extraction expression list A. During the selection of this process, the "ns" low-level feature extraction expression lists selected by the above-described selection creation process may be either excluded from the candidate lists or may be left intact as part of the candidate lists. Likewise, the low-level feature extraction expression lists selected in step S192 of the cross creation process above may be either excluded from the candidate lists or may be left intact as part of the candidate lists.

In step S203, the low-level feature extraction expression list creation section 61 randomly determines the number "m" of expressions in each low-level feature extraction expression list to be created through a subsequent expression loop.

More specifically, the low-level feature extraction expression list creation section 61 randomly determines in step S203 the expression count "m" for each low-level feature extraction expression list within the range defined as follows:

$$m=\text{number of expressions in list } A \pm mr$$

where, "mr" is a predetermined value.

In step S204, the control section 27 starts the expression loop by initializing the expression loop parameter M to "1." The expression loop is repeated as many times as the expression count "m" randomly determined in step S203.

In step S205, the low-level feature extraction expression list creation section 61 checks to determine whether the contribution ratio of the low-level feature computed using the M-th low-level feature extraction expression out of all low-level feature extraction expressions in the low-level feature extraction expression list A is lower than the contribution ratios of the low-level features computed using the other low-level feature extraction expression expressions in the low-level feature extraction expression list A. More specifically, a check is made to determine whether the contribution ratio of the low-level feature computed using the M-th low-level feature extraction expression is lower than a predetermined ratio in sequence of the contribution ratios computed using all low-level feature extraction expressions in the low-level feature extraction expression list A.

If in step S205 the contribution ratio of the low-level feature computed using the M-th low-level feature extraction expression is found to be lower than the others, then step S206 is reached. In step S206, the low-level feature extraction expression list creation section 61 randomly mutates the M-th low-level feature extraction expression for inclusion in the low-level feature extraction expression list of the next generation.

If in step S205 the contribution ratio of the low-level feature computed using the M-th low-level feature extraction expression is not found to be lower than the others, then step S207 is reached. In step S207, the low-level feature extraction expression list creation section 61 adds the M-th low-level feature extraction expression to the low-level feature extraction expression list of the next generation without mutating the expression in question.

If the randomly determined expression count "m" is found to be larger than the number of low-level feature extraction expressions constituting the low-level feature extraction expression list A, then the check of step S205 is omitted when the expression loop parameter M exceeds the low-level feature extraction expression count for the list A. At this point, a low-level feature extraction expression is randomly created and added to the low-level feature extraction expression list of the next generation.

In step S208, the control section 27 checks to determine whether the expression loop parameter M is smaller than the maximum value "m." If the expression loop parameter M is found to be smaller than the maximum value "m" then the expression loop parameter M is incremented by "1" and step S205 is reached again. On the other hand, if the expression loop parameter M is not found to be smaller than the maximum valise "m" (i.e., if the parameter M is equal to the maximum value "m"), then the expression loop is exited and step S209 is reached.

A single low-level feature extraction expression list is thus created in steps S203 through S208 above.

In step S209, the control section 27 checks to determine whether the mutation loop parameter NM is smaller than the maximum value "nm." If the mutation loop parameter NM is found to be smaller than the maximum value "nm," then the mutation loop parameter NM is incremented by and step S202 is reached again. On the other hand, if the mutation loop parameter NM is not found to be smaller than the maximum value "nm" (i.e., if the parameter NM is equal to the maximum value "nm"), then the mutation loop is exited and the mutation creation process is terminated. The low-level feature extraction expression lists amounting to the mutation count "nm" are thus created by the processing up to this point.

According to the above-described next-generation list genetic creation process performed by the low-level feature extraction expression list creation section 61, the low-level feature extraction expression lists of the latest generation which have high evaluation values are transmitted to the next generation and so are the low-level feature extraction expressions of the latest generation which have high contribution ratios. Those with low evaluation values and contribution ratios are discarded without being transmitted to the next generation. That is, as generations progress, the evaluation values of the low-level feature extraction expression lists are expected to improve and so are the contribution ratios of the low-level feature extraction expressions.

Returning to FIG. 7, the low-level feature extraction expression lists of the next generation created as discussed above are output by the low-level feature extraction expression list creation section 61 to the low-level feature computation section 24. In step S3, the low-level feature computation section 24 computes low-level features by substituting the input data (content data and metadata) of "j" songs C1 through Cj into each of "n" low-level feature extraction expression lists input from the low-level feature extraction expression list creation section 61. The resulting "n" low-level features are output to the high-level feature extraction expression learning section 65.

In step S4, the high-level feature extraction expression learning section 65 estimates (i.e., creates) "n" high-level feature extraction expression combinations each composed of "k" high-level feature extraction expressions through learning based on the "n" low-level features input from the low-level feature computation section 24 and on corresponding training data. The high-level feature extraction expression learning section 65 further computes the evaluation value of each high-level feature extraction expression and the contribution ratio of each low-level feature in each high-level feature extraction expression, and outputs the results of the computations to the low-level feature extraction expression list creation section 61.

The high-level feature extraction expression learning process of step S4 performed by the high-level feature extraction expression learning section 65 is described below in detail with reference to the flowchart of FIG. 45.

In step S211, the control section 27 starts the list loop by initializing the list loop parameter N to "1," The list loop is repeated as many times as the predetermined list count "n." In step S212, the control section 27 starts the training data loop by initializing the training data loop parameter K to "1," The training data loop is repeated as many times as the predetermined training data type count "k."

In step S213, the control section 27 starts the algorithm loop by initializing the algorithm loop parameter A to "1." The algorithm loop is repeated as many times as the predetermined learning algorithm type count "a." Used in the algorithm loop are the same kinds of algorithms as discussed above in connection with the feature extraction algorithm creation apparatus 20.

In step S214, the control section 27 starts the cross validation loop by initializing the cross validation loop parameter C to "1." The cross validation loop is repeated as many times as the predetermined cross validation count "c."

In step S215, the high-level feature extraction expression learning section 65 randomly bisects K-th type training data (true high-level features) about "j" songs out of as many as "k" training data types, into learning-use data and evaluation-use data. In the ensuing description, the training data classified for learning use will be referred to as the learning data and the training data classified for evaluation use will be called the evaluation data.

In step S216, the high-level feature extraction expression learning section 65 estimates a high-level feature extraction expression through learning that involves the application to an a-th learning algorithm of corresponding learning data as well as a combination of multiple low-level features computed using the N-th low-level feature extraction expression list.

The learning process above, unlike the one carried out by the high-level feature extraction expression learning section 25, utilises all low-level features computed using the N-th low-level feature extraction expression list (the result of the computation is called the low-level feature combination). This turns the evaluation value of the high-level feature extraction expression into a value that gives due consideration to whether or not the number of original low-level features is sufficiently large.

Figure 46:
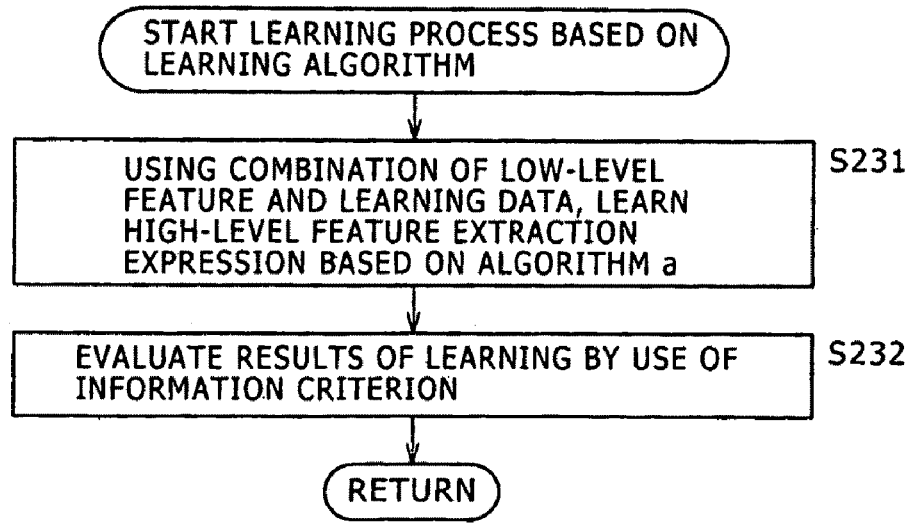
FIG. 46 is a flowchart of steps constituting a learning process based on a learning algorithm and performed by the high-level feature extraction expression learning section as part of the structure in FIG. 5.

Described below with reference to FIG. 46 is the learning process based on a learning algorithm in step S216 performed by the high-level feature extraction expression learning section 65.

In step S231, the high-level feature extraction expression learning section 65 estimates a high-level feature extraction expression through learning that involves the application to an A-th learning algorithm of the low-level feature combination and the learning data out of the training data.

In step S232, the high-level feature extraction expression learning section 65 computes the information quantity criterion AIC or BIC as the evaluation value of the high-level feature obtained from the preceding step. This brings the learning process based on a learning algorithm to an end.

Figure 45:
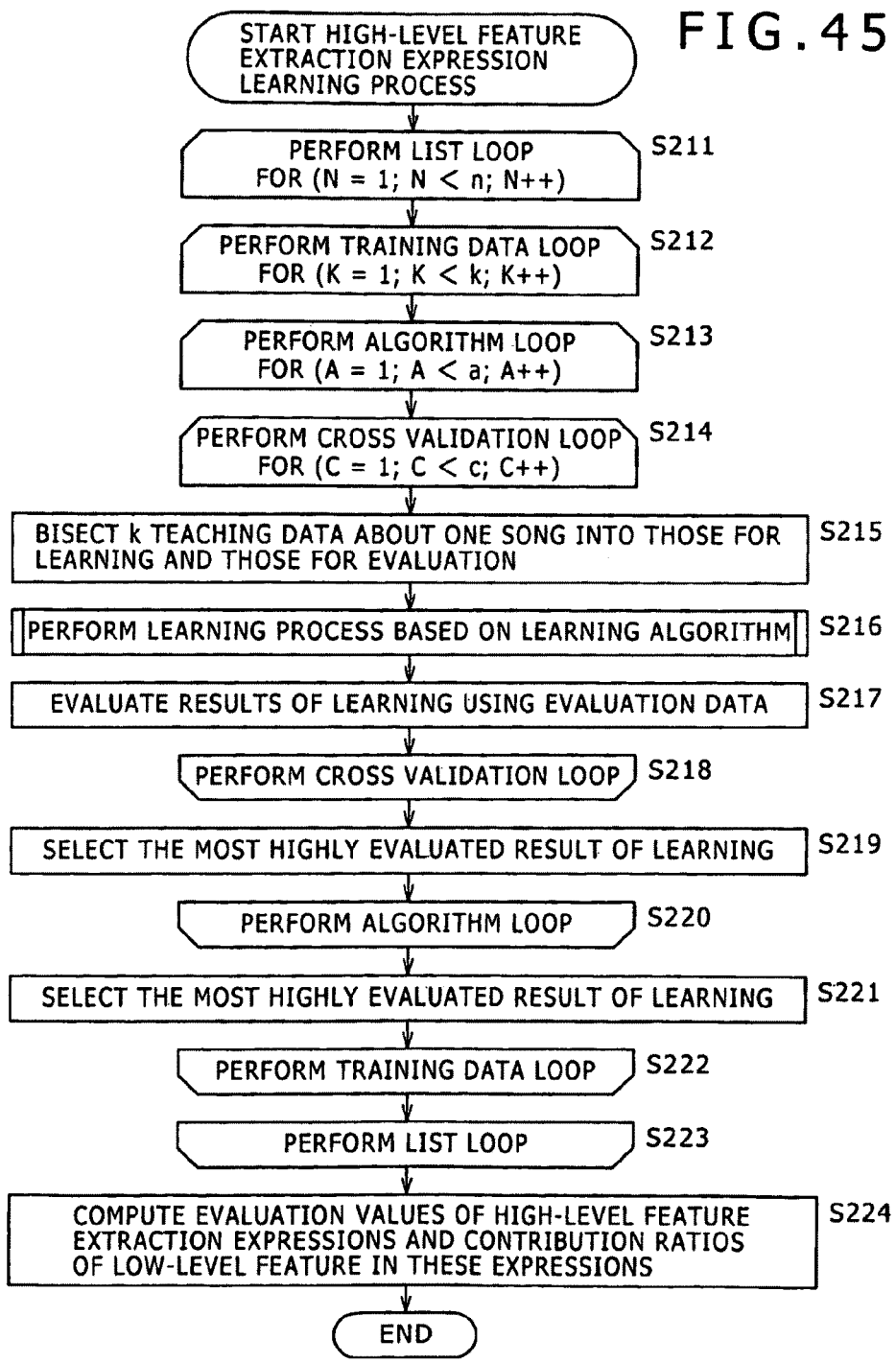
FIG. 45 is a flowchart of steps constituting a high-level feature extraction expression learning process performed by a high-level feature extraction expression learning section as part of the structure in FIG. 40.

In step S217 back in FIG. 45, the high-level feature extraction expression learning section 65 evaluates the high-level feature extraction expression acquired in step S216 using the evaluation data. More specifically, the high-level feature extraction expression learning section 65 computes the high-level feature using the acquired high-level feature extraction expression and finds the square error between the computed high-level feature and the evaluation data.

In step S218, the control section 27 checks to determine whether the cross validation loop parameter C is smaller than the maximum value "c." If the cross validation loop parameter C is found to be smaller than the maximum value "c," then the parameter C is incremented by "1" and step S215 is reached again. On the other hand, if the cross validation loop parameter C is not found to be smaller than the maximum value "c" (i.e., if the parameter C is equal to the maximum value "c"), then the cross validation loop is exited and step S219 is reached. As many as "c" high-level feature extraction expressions are thus acquired as a result of the learning in steps S214 through S218 constituting the cross validation loop. Because the learning data and evaluation data are randomly transformed through the cross validation loop, it is possible to verify that the high-level feature extraction expressions are not over-learned.

In step S219, the high-level feature extraction expression learning section 65 selects the high-level feature extraction expression having the highest evaluation value derived from step S217 out of the "c" high-level feature extraction expressions acquired through the cross validation loop.

In step S220, the control section 27 checks to determine whether the algorithm loop parameter A is smaller than the maximum value "a." If the algorithm loop parameter A is found to be smaller than the maximum value "a," then the parameter A is incremented by "1" and step S214 is reached again. On the other hand, if the algorithm loop parameter A is not found to be smaller than the maximum value "a" (i.e., if the parameter A is equal to the maximum value "a"), then the algorithm loop is exited and step S221 is reached. As many as "a" high-level feature extraction expressions of the K-th type learned using "a" learning algorithms are thus acquired in steps S213 through S220 constituting the algorithm loop.

In step S221, the high-level feature extraction expression learning section 65 selects the high-level feature extraction expression having the highest evaluation value derived from step S217 out of the "a" high-level feature extraction expressions learned through the algorithm loop.

In step S222, the control section 27 checks to determine whether the training data loop parameter K is smaller than the maximum value "v." If the training data loop parameter K is found to be smaller than the maximum value "k," then the parameter K is incremented by "1" and step S213 is reached again. On the other hand, if the training data loop parameter K is not found to be smaller than the maximum, value (i.e., if the parameter K is equal to the maximum value "k"), then the training data loop is exited and step S223 is reached. As many as "k" high-level feature extraction expressions corresponding to the K-th low-level feature extraction expression list are thus acquired in steps S212 through S222 constituting the training data loop.

In step S223, the control section 27 checks to determine whether the list loop parameter N is smaller than the maximum value "n." If the list loop parameter N is found to be smaller than the maximum value "n," then the parameter N is incremented by "1" and step S212 is reached again. On the other hand, if the list loop parameter N is not found to be smaller than the maximum value "n" (i.e., if the parameter N is equal to the maximum value "n"), then the list loop is exited and step S224 is reached. As many as "k" high-level feature extraction expressions corresponding to each of "n" low-level feature extraction expression lists are thus acquired in steps S221 through S223 constituting the list loop.

In step S224, the high-level feature extraction expression learning section 65 computes the contribution ratio of each of "k" high-level feature extraction expressions corresponding to each of the acquired "n" low-level feature extraction expression lists, and outputs the results of the computations to the low-level feature extraction expression list creation section 61 together with the evaluation value of the high-level feature extraction expression computed in step S217. This brings the high-level feature extraction expression learning process to an end.

In step S5 back in FIG. 7, the control section 27 checks to determine whether the learning loop parameter G is smaller than the maximum value "g." If the learning loop parameter G is found to be smaller than the maximum value "g," then the parameter G is incremented by "1" and step S2 is reached again. On the other hand, if the learning loop parameter G is not found to be smaller than the maximum value "g" (i.e., if the parameter G is equal to the maximum value "g"), then the learning loop is exited and step S6 is reached. Steps S1 through S3 constitute the feature extraction algorithm learning process. Step S6 following that process is a process for computing high-level features using feature extraction algorithms.

In step S6, the high-level feature extraction expression learning section 65 supplies the high-level feature computation section 26 with the low-level feature extraction expressions constituting the list having the highest mean evaluation value of the acquired high-level features out of "n" low-level feature extraction expression lists of the latest generation obtained through learning, along with "k" high-level feature extraction expressions corresponding to that list.

In step S7, the high-level feature computation section 26 computes a high-level feature with high accuracy using the low-level feature extraction expressions and high-level feature extraction expressions supplied most recently from the high-level feature extraction expression learning section 65. The high-accuracy high-level feature computation process of step S7 was already discussed in connection with the feature extraction algorithm creation apparatus 20 and thus will not be described further.

The foregoing paragraph completes the description of the feature extraction algorithm creation process performed by the feature extraction algorithm creation apparatus 60.

According to the above-described feature extraction algorithm learning process performed by the feature extraction algorithm creation apparatus 60 as the second embodiment of the present, invention, it is possible to create accurately and quickly algorithms for extracting relevant features from song data. The process also permits acquisition of highly accurate high-level features with a significantly small amount of computations.

Particularly noteworthy is the ability to randomly determine the number "m" of expressions constituting each low-level feature extraction expression list. This, unlike the feature extraction algorithm learning process performed by the feature extraction algorithm creation apparatus 20, helps avoid handling too many low-level features through onerous and potentially inaccurate processing and thereby contributes to yielding results with high accuracy.

The present invention can be applied not only to acquiring high-level features from song data but also to obtaining high-level features from content data in diverse categories including video data.

The series of steps and processes described above may be executed either by hardware or by software. For the software-based processing to take place, the programs constituting the software may be either incorporated beforehand in dedicated hardware of a computer for program execution or installed upon use from a suitable recording medium into a general-purpose personal computer such as one shown in FIG. 47 or like equipment capable of executing diverse functions based on the installed programs.

A personal computer 100 shown in FIG. 47 incorporates a CPU (Central Processing Unit) 101. An input/output interface 105 is connected to the CPU 101 through a bus 104. The bus 104 is connected to a ROM (Read Only Memory) 102 and a RAM (Random Access Memory) 103.

The input/output interface 105 is connected to an input device 106, an output device 107, a storage device 108, and a communication device 109. The input device 106 is made up of such input device elements as a keyboard and a mouse to be operated by the user to enter operation commands. The output device 107 is composed of a display device such as a CRT (Cathode Ray Tube) or an LCD (Liquid Crystal Display) on which to display operation screens and other information. The storage device 108 is typically constituted by a hard disk drive for accommodating programs and data. The communication device 109 is formed by a modem and/or a LAN (Local Area Network) adapter for conducting communications over networks such as the Internet. The input/output interface 105 is further connected to a drive 110 that writes and reads data to and from a recording medium 111 such as magnetic disks (including flexible disks), optical disks (including CD-ROM (Compact Disc-Read Only Memory) and DVD (Digital Versatile Disc)), magneto-optical disks (including MD (Mini Disc)), or semiconductor memories.

The programs for causing the personal computer 100 to execute the above-described steps and processes are stored on the recording medium 111 before being submitted to the computer 100. The programs are read by the drive 110 from the recording medium 100 and installed onto the hard disk drive in the storage device 103. The programs held in the storage device 108 are loaded from there into the RAM 103 for execution based on instructions issued by the CPU 101 in response to the commands entered by the user through the input device 106.

In this description, the steps to be executed on the basis of the stored programs represent not only the processes that are to be carried out in the depicted sequence (i.e., on a time series basis) but also processes that may be performed parallelly or individually and not chronologically.

The programs may be processed either by a single computer or by a plurality of computers on a distributed basis. The programs may also be transferred to a remotely located computer or computers for execution.

In this specification, the term "system" refers to an entire configuration made up of a plurality of component devices.

It should be understood by those skilled in the art that various modifications, combinations, sub-combinations and alterations may occur depending on design requirements and other factor in so far as they are within the scope of the appended claims or the equivalents thereof.

The invention claimed is:

1. An information processing apparatus which creates a feature detection algorithm for detecting features from content data, said information processing apparatus comprising:

low-level feature extraction expression list creation means for creating next-generation expression lists each constituted by a plurality of low-level feature extraction expressions through learning based on latest-generation expression lists, said low-level feature extraction expressions being expressions to which either said content data or metadata corresponding to said content data is input and from which low-level features are output;

computation means for computing said low-level features using said next-generation expression lists created by said low-level feature extraction expression list creation means; and high-level feature extraction expression creation means for creating high-level feature extraction expressions through learning based on training data constituted by previously furnished true high-level features corresponding to said content data, said high-level feature extraction expressions being expressions to which said low-level features computed by said computation means are input and from which high-level features characteristic of said content data are output, wherein the learning comprises:

bisecting the training data into learning data and evaluation data, evaluating the results of the learning using the relevant evaluation data, performing a cross-validation loop, selecting the most highly-evaluated result of the cross-validation loop, performing an algorithm loop, selecting the most highly-evaluated result of the algorithm loop, performing a training data loop, and performing a list loop.

2. The information processing apparatus according to claim 1,
  wherein said high-level feature extraction expression creation means computes at least, either accuracy levels of the created high-level feature extraction expressions or contribution ratios of said low-level features in said high-level feature extraction expressions; and
  wherein said low-level feature extraction expression list creation means updates said low-level feature extraction expressions constituting said low-level feature extraction expression lists at least on the basis of either the accuracy levels of said high-level feature extraction expressions or the contribution ratios of said low-level features in said high-level feature extraction expressions, said accuracy levels and said contribution ratios having been computed by said high-level feature extraction expression creation means.

3. The information processing apparatus according to claim 1, wherein said low-level feature extraction expression list creation means randomly creates first-generation expression lists.

4. The information processing apparatus according to claim 1, wherein said low-level feature extraction expression list creation means creates said next-generation expression lists using a genetic algorithm based on said latest-generation expression lists through at least one of a selection process, a cross process, and a mutation process.

5. The information processing apparatus according to claim 1, wherein said low-level feature extraction expression list creation means creates said next-generation expression lists each constituted by a predetermined constant number of low-level feature extraction expressions.

6. The information processing apparatus according to claim 1, wherein said low-level feature extraction expression list creation means creates said next-generation expression lists each constituted by a predetermined constant number of low-level feature extraction expressions randomly determined every time each of said lists is created.

7. The information processing apparatus according to claim 6,
  wherein said high-level feature extraction expression creation means computes at least either evaluation values of the created high-level feature extraction expressions or contribution ratios of said low-level features in said high-level feature extraction expressions; and
  wherein said low-level feature extraction expression list creation means updates said low-level feature extraction expressions constituting said low-level feature extraction expression lists at least on the basis of either the evaluation values of said high-level feature extraction expressions or the contribution ratios of said low-level features in said high-level feature extraction expressions, said evaluation values and said contribution ratios having been computed by said high-level feature extraction expression creation means.

8. An information processing method for use with an information processing apparatus which creates a feature detection algorithm for detecting features from content data, said information processing method comprising the steps of:
  creating next-generation expression lists each constituted by a plurality of low-level feature extraction expressions through learning based on latest-generation expression lists, said low-level feature extraction, expressions being expressions to which either said content data or metadata corresponding to said content data is input and from which low-level features are output;
  computing said low-level features using the created next-generation expression lists; and
  creating high-level feature extraction expressions through learning based on training data constituted by previously furnished true high-level features corresponding to said content data, said high-level feature extraction expressions being expressions to which the computed low-level features are input and from which high-level features characteristic of said content data are output,
  wherein the learning comprises:
    bisecting the training data into learning data and evaluation data,
    evaluating the results of the learning using the relevant evaluation data,
    performing a cross-validation loop,
    selecting the most highly-evaluated result of the cross-validation loop,
    performing an algorithm loop,
    selecting the most highly-evaluated result of the algorithm loop,
    performing a training data loop, and
    performing a list loop.

9. A non-transitory computer-readable storage medium having computer-executable instructions that when executed cause a computer of said information processing apparatus to carry out a procedure comprising the steps of:
  creating next-generation expression lists each constituted by a plurality of low-level feature extraction expressions through learning based on latest-generation expression lists, said low-level feature extraction expressions being expressions to which either said content data or metadata corresponding to said content data is input and from which low-level features are output;
  computing said low-level features using the created next-generation expression lists; and
  creating high-level feature extraction expressions through learning based on training data constituted by previously furnished true high-level features corresponding to said content data, said high-level feature extraction expressions being expressions to which the computed low-level features are input and from which high-level features characteristic of said content, data are output,
  wherein the learning comprises:
    bisecting the training data into learning data and evaluation data,
    evaluating the results of the learning using the relevant evaluation data,
    performing a cross-validation loop,
    selecting the most highly-evaluated result of the cross-validation loop,
    performing an algorithm loop,
    selecting the most highly-evaluated result of the algorithm loop,
    performing a training data loop, and
    performing a list loop.

* * * * *

UNITED STATES PATENT AND TRADEMARK OFFICE
CERTIFICATE OF CORRECTION

PATENT NO. : 8,315,954 B2
APPLICATION NO. : 11/722508
DATED : November 20, 2012
INVENTOR(S) : Yoshiyuki Kobayashi Page 1 of 1

It is certified that error appears in the above-identified patent and that said Letters Patent is hereby corrected as shown below:

Title page, item (86), "PCT/JP2006/021260" should read --PCT/JP2006/321260--

Signed and Sealed this
Fifth Day of February, 2013

Teresa Stanek Rea
*Acting Director of the United States Patent and Trademark Office*